(12) United States Patent
Kagawa et al.

(10) Patent No.: US 7,177,469 B2
(45) Date of Patent: Feb. 13, 2007

(54) COLOR CONVERSION DEVICE AND COLOR CONVERSION METHOD

(75) Inventors: Shuichi Kagawa, Tokyo (JP); Hiroaki Sugiura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 813 days.

(21) Appl. No.: 10/437,904

(22) Filed: May 15, 2003

(65) Prior Publication Data

US 2003/0228055 A1 Dec. 11, 2003

(30) Foreign Application Priority Data

Jun. 5, 2002 (JP) ............................. 2002-163866

(51) Int. Cl.
*G06K 9/00* (2006.01)
(52) U.S. Cl. ...................................... 382/167; 358/518
(58) Field of Classification Search ................ 382/162, 382/167, 274; 358/518, 520
See application file for complete search history.

(56) References Cited

U.S. PATENT DOCUMENTS

| | | | |
|---|---|---|---|
| 5,588,050 A | | 12/1996 | Kagawa et al. |
| 5,592,311 A | * | 1/1997 | Hibi ............................ 358/518 |
| 5,729,360 A | | 3/1998 | Kita et al. |
| 5,742,410 A | * | 4/1998 | Suzuki ......................... 358/518 |
| 6,014,457 A | * | 1/2000 | Kubo et al. .................. 382/167 |
| 6,125,202 A | | 9/2000 | Kagawa et al. |

FOREIGN PATENT DOCUMENTS

| | | |
|---|---|---|
| EP | 1 435 729 | 7/2004 |
| JP | 60-220660 A | 11/1985 |
| JP | 63-39188 B2 | 8/1988 |
| JP | 63-227181 A | 9/1988 |
| JP | 4-304775 A | 10/1992 |
| JP | 4-335771 A | 11/1992 |
| JP | 11-69181 A | 3/1999 |
| JP | 11308472 A | 11/1999 |
| WO | WO 03/034710 | 4/2003 |

* cited by examiner

*Primary Examiner*—Phuoc Tran
(74) *Attorney, Agent, or Firm*—Birch, Stewart, Kolasch & Birch, LLP

(57) ABSTRACT

In a color conversion device, first color correction amounts are determined from first image data consisting of a plurality of first color data, and second color correction amounts are determined from characteristics information of the first image data is calculated, and the first color correction amounts. The second color correction amounts are added to the first image data, to determine the second image data. The characteristics information is determined by calculating the characteristics information by a calculation using the lightness information and the chroma information of the first image data, so that color conversion reflecting characteristics information including the lightness information and the chroma information of the image is achieved.

12 Claims, 17 Drawing Sheets

| IDENTIFICATION CODE S1 | MAXIMUM VALUE β | MINIMUM VALUE α | HUE DATA THAT ARE ZERO* |
|---|---|---|---|
| 0 | R i | G i | g, c |
| 1 | R i | B i | b, c |
| 2 | G i | R i | r, m |
| 3 | G i | B i | b, m |
| 4 | B i | R i | r, y |
| 5 | B i | G i | g, y |

\* FROM r=Ri-α, g=Gi-α, b=Bi-α,
y=β-bi, m=β-gi, c=β-Ri

| IDENTIFICATION CODE S1 | Q1 | Q2 | P1 | P2 |
|---|---|---|---|---|
| 0 | r | b | m | y |
| 1 | r | g | y | m |
| 2 | g | b | c | y |
| 3 | g | r | y | c |
| 4 | b | g | c | m |
| 5 | b | r | m | c |

FIG. 19A

| HUE | EFFECTIVE FIRST ARITHMETIC TERM |
|---|---|
| RED | h1r |
| GREEN | h1g |
| BLUE | h1b |
| CYAN | h1c |
| MAGENTA | h1m |
| YELLOW | h1y |

FIG. 19B

| INTER-HUE AREA | EFFECTIVE SECOND ARITHMETIC TERM |
|---|---|
| RED-YELLOW | h2ry |
| YELLOW-GREEN | h2gy |
| GREEN-CYAN | h2gc |
| CYAN-BLUE | h2bc |
| BLUE-MAGENTA | h2bm |
| MAGENTA-RED | h2rm |

Rs  Gs  Bs

Rn  Gn  Bn

Ri  Gi  Bi

COLOR CONVERSION DEVICE AND COLOR CONVERSION METHOD

BACKGROUND OF THE INVENTION

1. Field of the Invention

The present invention relates to data processing used for example in full-color printing related equipment, such as printers, video printers, scanners, or the like, or image processing equipment such as those for generating computer-graphics images, or display devices such as monitors, and in particular to an image processing device and method for image-processing the image data represented by three colors of red, green and blue, to be suitable for the equipment used.

2. Description of Related Art

Color conversion in printing is an essential image technology for compensating for deterioration of printed images, due to color-mixing property caused by the fact that inks are not of pure colors, and due to non-linearity of the image printing, and outputting printed images with a good color reproducibility. In display devices, such as monitors, color conversion is effected for outputting (displaying) an image with a desired color reproduction characteristics suitable for the conditions in which the device is used, in displaying the input color data.

The color conversion can be realized by a table conversion method or a matrix calculation method.

A representative example of table conversion method is a three-dimensional look-up table method, in which image data represented by red, green and blue (hereinafter referred to as "R, G, B") are input, and image data of R, G, B, or complementary color data of yellow, magenta and cyan (hereinafter referred to as "Y, M and C") stored in advance in a memory, such as a ROM are output. This method permits use of any desired conversion characteristics so that color conversion with a good color reproducibility can be achieved.

A problem associated with the table conversion method is the size of the memory required. In a simple configuration in which, for each combination of the input image data, data to be output is stored, a memory with a capacity of about 400 Mbits is needed. For instance, Japanese Patent Kokai Publication No. S63-227181 discloses a method of compressing the memory capacity, but the required capacity is still about 5 Mbits. Thus, this method requires a memory of a large capacity for each conversion characteristics, and it is difficult to implement the method by means of LSIs. Another problem is that the method cannot be flexibly adapted to changes in the use conditions or the like.

In the matrix calculation method, the following equation (1) is a basic calculation equation used for converting certain image data Ri, Gi, Bi to another image data Ro, Go, Bo.

$$\begin{bmatrix} Ro \\ Go \\ Bo \end{bmatrix} = (Aij) \begin{bmatrix} Ri \\ Gi \\ Bi \end{bmatrix} \quad (1)$$

In the equation (1), i=1 to 3, j=1 to 3.

Here, the desired color reproduction may be an "exact color reproduction" or a "preferred color reproduction." The "exact color reproduction" is an exact or faithful color reproduction that is as close as possible to the original image. To realize the exact color reproduction, it is contemplated to perform color reproduction using a standard color space, such as NTSC or sRGB. On the other hand, a "preferred color reproduction" is a color reproduction that is preferred by a human being, taking account of the characteristics of the human visual perception, and memory colors, and is not necessarily identical with the "exact color reproduction." In a color reproduction used for display of moving pictures, such as those of television pictures, a "preferred color reproduction" is often performed. In the memory colors of human beings, there is a tendency that the color of the sky, and the green color of the grass are memorized as colors which are brighter, of a higher chroma. Accordingly, for realizing a "preferred color reproduction," a color conversion to increase the chroma of the colors is often applied to the input color data. Moreover, even in the "exact color reproduction," it is not rare that a color conversion to increase the chroma of the colors is applied to the input color data.

Also, the color data input to an image display device are not necessarily identical with the original color data generated at a color data source, such as a camera. This is because the various noises are applied in the process of transmission of the color data. Further consideration is given on a case where the original color generated by a camera are transmitted over a transmission path, and input to an image display device. Let us assume that the original color data output from the camera are denoted by Rs, Gs, Bs, respectively representing red, green and blue, and the color data input to the image display device are denoted by Ri, Gi, Bi. If there are no effects of noises over the transmission path, and the procedures for transmission and reception are conducted accurately, then the following relationship should be satisfied.

Rs=Ri, Gs=Gi, Bs=Bi

In reality, it is considered that there is an effect of noises in the transmission path. Moreover, it is also conceived that some errors may occur in the procedures at the time of transmission and reception. If the noise components which are the effects of noises or the effects on the color data due to the errors in the procedures of transmission and reception are denoted by Rn, Gn, and Bn, the color data Ri, Gi, and Bi input to the image display device are given by:

Ri=Rs+Rn,

Gi=Gs+Gn,

Bi=Bs+Bn.

That is, the color data Ri, Gi, and Bi input to the image display device are the respective sums of the original data components Rs, Gs, and Bs, and the noise components Rn, Gn, and Bn.

Let us consider a situation where color conversion to increase the chroma of the colors is applied to Ri, Gi, Bi input to the image display device to realize a "preferred color reproduction." When conversion to increase the chroma of the color data represented by Ri, Gi, Bi is effected, not only the chroma of the original color data components Rs, Gs, Bs, but also the chroma of the noise components Rn Gn, Bn is increased. When the original color data components Rs, Gs, Bs are small, the effects of the noise components Rn, Gn, Bn are relatively large, and the chroma of the noise components Rn, Gn, Bn is increased by a larger amount. As a result, in dark parts of the image where the original color components Rs, Gs, Bs are small, the color conversion increases the effects of the noise or the effects of errors during transmission and reception. It is therefore necessary to take care not to increase the effects of noise or the effects of errors during transmission and reception, in performing color conversion of dark parts of the image where the original color data components Rs, Gs, Bs are small When the original color data Rs, Gs, Bs are small, the color data Ri, Gi, Bi input to the image display device are small, resulting in dark colors. It is therefore possible to estimate, from the features or characteristics, such as lightness of the color data Ri, Gi, Bi input to the image display device, that the effects of the noise components Rn, Gn, Bn will be relatively large.

However, the conventional color conversion method using the above equation (1), in which color conversion is effected without taking into consideration the characteristics, such as lightness of the color data Ri, Gi, Bi input to the image display device, is associated with the problem that the color conversion increases the effects of the noises or the effects of errors during transmission and reception, in the dark parts of the image where the original color data components Rs, Gs, Bs are small.

Let us assume that each of the color data representing red, green and blue are any integer of from 0 to 255. FIG. 20A to FIG. 20C show an example of the original color data components Rs, Gs, Bs, the noise components Rn, Gn, Bn, and the color data Ri, Gi, Bi input to the image display device, in a case where the noise components Rn, Gn, Bn are relatively small compared with the original color data components Rs, Gs, Bs. In FIG. 20A to FIG. 20C, the vertical axis represents the magnitudes of the signals. FIG. 20A shows an example of the original color data components Rs, Gs, Bs, with Rs=192, Gs=64, Bs=64. FIG. 20B shows an example of noise components Rn, Gn, Bn, with Rn=8, Gn=8, Bn=24. FIG. 20C shows the color data Ri, Gi, Bi input to the image display device, that are obtained from Rs, Gs, Bs shown in FIG. 20A and Rn, Gn, Bn shown in FIG. 20B, and Ri=200, Gi=72, Bi=88. The original color data components Rs, Gs, Bs shown in FIG. 20A represent a red color. The color data Ri, Gi, Bi shown in FIG. 20C and input to the image display device represent slightly bluish red, due to the effects of the noise components Rn, Gn, Bn.

FIG. 21A to FIG. 20C show an example of the original color data components Rs, Gs, Bs, the noise components Rn, Gn, Bn, and the color data Ri, Gi, Bi input to the image display device, in a case where the noise components Rn, Gn, Bn are relatively large compared with the original color data components Rs, Gs, Bs (the original color data components Rs, Gs, Bs are relatively small compared with the noise components Rn, Gn, Bn). In FIG. 21A to FIG. 21C, the vertical axis represents the magnitudes of the signals. FIG. 21A shows an example of the original color data components Rs, Gs, Bs, with Rs=24, Gs=8, Bs=8. FIG. 21B shows an example of noise components Rn, Gn, Bn, with Rn=8, Gn=8, Bn=24 (values identical to those in FIG. 20A to FIG. 20C). FIG. 21C shows the color data Ri, Gi, Bi input to the image display device, that are obtained from Rs, Gs, Bs shown in FIG. 21A and Rn, Gn, Bn shown in FIG. 21B, and Ri=32, Gi=16, Bi=32. The original color data component Rs, Gs, Bs shown in FIG. 21A represent a red color. The color data Ri, Gi, Bi shown in FIG. 21C and input to the image display device represent magenta, due to the effects of the noise components Rn, Gn, Bn, and there is thus a larger change in the hue.

It is seen from comparison between FIG. 20A to FIG. 20C and FIG. 21A to FIG. 21C, that the difference between the hue of the color represented by the original color data components Rs, Gs, Bs and the hue of the color represented by the color data Ri, Gi, Bi input to the image display device, caused by the noise components Rn, Gn, Bn is larger as the noise components Rn, Gn, Bn are larger than the original color data components Rs, Gs, Bs (the original color data components Rs, Gs, Bs are smaller than the noise components Rn, Gn, Bn). Accordingly, in dark parts of an image, where the original color data components Rs, Gs, Bs are small, there are larger effects of noise components Rn, Gn, Bn.

The image display device is provided with a color conversion circuit to convert the color of the input color data Ri, Gi, Bi. FIG. 22 is a block diagram showing an example of conventional color conversion circuit. In FIG. 22, reference numeral 1 denotes a color correction amount calculator, 2 denotes a color correction amount adder. Color data Ri, Gi, Bi are input to the color correction amount calculator 1. The color correction amount calculator 1 calculates color correction amounts R1, G1, B1 based on the color data Ri, Gi, Bi, and the calculated color correction amounts are output to the color correction amount adder 2. The color data Ri, Gi, Bi are also input to the color correction amount adder 2, and added to the color correction amounts R1, G1, B1 at the color correction amount adder 2, and second color data Ro, Go, Bo are thereby determined. The calculation at the color correction amount calculator 1 to produce the color correction amounts R1, G1, B1 is conducted without taking into consideration the characteristics such as lightness of the input color data Ri, Gi, Bi.

The color conversion circuit shown in FIG. 22 performs color conversion expressed by the following equation (2). The equation (2) can be obtained by transforming the equation (1) as follows. Accordingly, the color conversion circuit shown in FIG. 22 can be said to perform the color conversion of equation (1).

$$\begin{bmatrix} Ro \\ Go \\ Bo \end{bmatrix} = \begin{bmatrix} 1 & 0 & 0 \\ 0 & 1 & 0 \\ 0 & 0 & 1 \end{bmatrix} \begin{bmatrix} Ri \\ Gi \\ Bi \end{bmatrix} + (A'ij) \begin{bmatrix} Ri \\ Gi \\ Bi \end{bmatrix} = \begin{bmatrix} Ri \\ Gi \\ Bi \end{bmatrix} + (A'ij) \begin{bmatrix} Ri \\ Gi \\ Bi \end{bmatrix} \quad (2)$$

In the equation (2), i=1 to 3, j=1 to 3.

At the same time, color correction amounts R1, G1, B1 are determined by the linear calculation of the following equation (3) in the color correction amount calculator 1.

$$\begin{bmatrix} R1 \\ G1 \\ B1 \end{bmatrix} = (A'ij) \begin{bmatrix} Ri \\ Gi \\ Bi \end{bmatrix} \quad (3)$$

Thus, in the conventional color conversion method, color conversion is effected without taking into consideration the features or characteristics such as lightness of the color data Ri, Gi, Bi input to the image display device. Accordingly, when a processing to increase the chroma of the color data, i.e., to enhance the colors, in the conventional color conversion, the colors are enhanced even when there are large effects of the noise components Rn, Gn, Bn. As a result, in the dark parts of the image, the effects of the noise components are further increased, and the images displayed on the image display device will become very unpleasant.

Conventional color conversion methods in which the characteristics of the color data Ri, Gi, Bi input to the image display device are not taken into consideration is also associated with a problem that color contraction in which fine differences in colors are lost in light colors by the color conversion may occur.

Further consideration is given to several numeral examples. It is assumed that the calculation at the color conversion circuit shown in FIG. 22 is made according to the above equation (2) using the coefficient matrix shown by the following equation (4).

$$(A'ij) = \begin{bmatrix} 0.2 & -0.1 & -0.1 \\ -0.1 & 0.2 & -0.1 \\ -0.1 & -0.1 & 0.2 \end{bmatrix} \quad (4)$$

When color data with Ri=230, Gi=20, Bi=20 are input, if there is no restriction on the range of values Ro, Go, Bo can assume, their values should be given by Ro=272, Go=−1, Bo=−1. However, since the values of Ro, Go, Bo are of integer values within the range of 0 to 255, the actual values are given by Ro=255, Go=0, Bo=0.

When color data with Ri=240, Gi=15, Bi=15 are input, if there is no restriction on the range of values Ro, Go, Bo can assume, their values should be given by Ro=285, Go=−8, Bo=−8. However, since the values of Ro, Go, Bo are of integer values within the range of 0 to 255, the actual values are given by Ro=255, Go=0, Bo=0. Accordingly, the values of Ro, Go, Bo obtained when the color data with Ri=230, Gi=20, Bi=20 are input, and the values of Ro, Go, Bo obtained when the color data with Ri=240, Gi=15, Bi=15 are input are identical with each other. That is, color contraction occurs.

Moreover, when color conversion to increase the chroma of the colors is conducted in the conventional conversion method in which the characteristics of the color data input to the image display device are not taken into consideration, color contraction by which fine differences in colors are lost at colors of a high chroma may occur.

The chroma Sat of the color data R, G, B can be defined using the maximum value MAX(R, G, B) and the minimum value MIN(R, G, B) of R, G, B, by the following equation (5).

$$Sat=(MAX(R,G,B)-MIN(R,G,B))/(R,G,B) \quad (5)$$

If each of R, G, B can assume any value of from 0 to 255, a monochromatic color of red is expressed by R=255, G=0, B=0, and chromaSat =1. White is expressed by R=255, G=255, B=255, and Sat=0. Increase in chroma Sat can be achieved by increase in the difference MAX(R, G, B)−MIN (R, G, B).

The chroma Sati of Ri, Gi, Bi input to the image display device is expressed by the following equation (6).

$$Sati=(MAX(Ri,Gi,Bi)-MIN(Ri,Gi,Bi))/MAX(Ri,Gi,Bi) \quad (6)$$

The chroma Sato of the color data Ro, Go, Bo obtained by the color conversion is expressed by the following equation (7).

$$Sato=(MAX(Ro,Go,Bo)-MIN(Ro,Go,Bo))/MAX(Ro,Go,Bo) \quad (7)$$

Increase in the chroma by the color conversion circuit shown in FIG. 22 can be achieved by using the values shown by the following equation (8) for the coefficient matrix in the equation (2).

$$(A'ij) = \begin{bmatrix} 0.2 & -0.2 & -0.2 \\ -0.2 & 0.2 & -0.2 \\ -0.2 & -0.2 & 0.2 \end{bmatrix} \quad (8)$$

When the input is given by Ri=255, Gi=128, Bi=128, the output will be given by Ro=255, Go=77, Bo=77. Here the fractional part (digits to the right of the decimal point) has been rounded. The chroma Sati of the input color data Ri, Gi, Bi is about 0.5 according to the above equation (6), and the chroma Sato of the output color data Ro, Go, Bo is 0.7 according to the above equation (7). Thus, the chroma of the color data is increased by the color conversion.

Let us now consider a situation where color data given by Ri=255, Gi=26, Bi=26 are input. The chroma Sati of the color data is 0.9. If there is no restriction on the range of values Ro, Go, Bo can assume, their values should be given by Ro=296, Go=−25, Bo=−25. However, because Ro, Go, Bo are restricted to assume an integer within the range of 0 to 255, the actual values are given by Ro=255, Go=0, Bo=0.

Let us now consider a situation where color data given by Ri=255, Gi=51, Bi=51 are input. The chroma Sati of the color data Ri, Gi, Bi is 0.8. If there is no restriction on the range of values Ro, Go, Bo can assume, their values should be given by Ro=286, Go=0, Bo=0. However, because Ro, Go, Bo are restricted to assume an integer within the range of 0 to 255, the actual values are given by Ro=255, Go=0, Bo=0. The values of Ro, Go, Bo obtained when the color data with Ri=255, Gi=26, Bi=26 are input, and the values of Ro, Go, Bo obtained when the color data with Ri=255, Gi=51, Bi=51 are input are identical with each other. That is, color contraction occurs.

When the conventional color conversion device or color conversion method is implemented by the table conversion method using a memory such as a ROM, a memory of a large capacity is required, and the conversion characteristics cannot be flexibly changed. In the case of the matrix calculation method, if a processing to increase the chroma of the color data, the effects of the noise components in the dark parts of the image may be emphasized, or color contraction wherein the fine differences in colors in the parts of high chroma or in the light parts are lost may occur.

SUMMARY OF THE INVENTION

The invention has been made to solve the problems described above, and its object is to provide a color conversion device or color conversion method for pixel-by-pixel conversion of image data consisting of a plurality of color data, which can restrain emphasis of effects of noise components in the dark parts of the image, and restrain occurrence of color contraction in the parts of high chroma, or in the light parts, and with which the conversion characteristics can be changed flexibly, and which does not require a memory of a large capacity.

The color conversion device according to the present invention is performing color conversion on first image data consisting of a plurality of first color data, and constituting image information for each pixel, into second image data consisting of a plurality of second color data, and constituting image information for each pixel. The color conversion device includes a unit for determining first color correction amounts from the first image data; and a unit for determining characteristics information of the first image data. The color conversion device also includes a unit for determining second color correction amounts from the characteristics information and the first color correction amounts; and a unit for determining the second image data by adding or subtracting the second color correction amounts to or from the first image data. The characteristics information determining unit calculates the characteristics information by calculation using lightness information and chroma information of the first image data.

Accordingly, it is possible to realize color conversion according to the characteristics information of the image data, and even when a processing to increase the chroma of the color data is performed, it is possible to obtain a good color reproduction without further emphasizing the effects of the noise components in dark parts of the image or the like, and even when a processing to increase the chroma of the color data is performed, it is possible to achieve color conversion, avoiding color contraction in the parts of a high lightness or high chroma of the image.

When only the lightness information of the image data is used as the characteristics information, it is possible to obtain the effects of restraining the emphasis of the noise components in the dark parts of the image, and of restraining the color contraction in the parts of a high lightness of the image, due to the processing to increase the lightness of the color data.

When only the chroma information of the image data is used as the characteristics information, it is possible to obtain the effects of restraining the color contraction in the parts of a high chroma of the image, due to the processing to increase the chroma of the color data.

In the color conversion device of the invention, the characteristics information is calculated using both of the lightness information and the chroma information of the image data, so that the effects obtained when only the lightness information is used and the effects obtained when only the chroma information is used, are both obtained, so that a very good color conversion can be achieved.

BRIEF DESCRIPTION OF THE DRAWINGS

In the accompanying drawings;

FIG. 19A and FIG. 19B schematically illustrate the arithmetic terms which relate to and are effective for each hue and a region between hues in the color conversion device according to Embodiment 2 of the present invention;

DETAILED DESCRIPTION OF THE PREFERRED EMBODIMENTS

Embodiments of the invention will now be described with reference to the drawings.

Embodiment 1.

Figure 1:
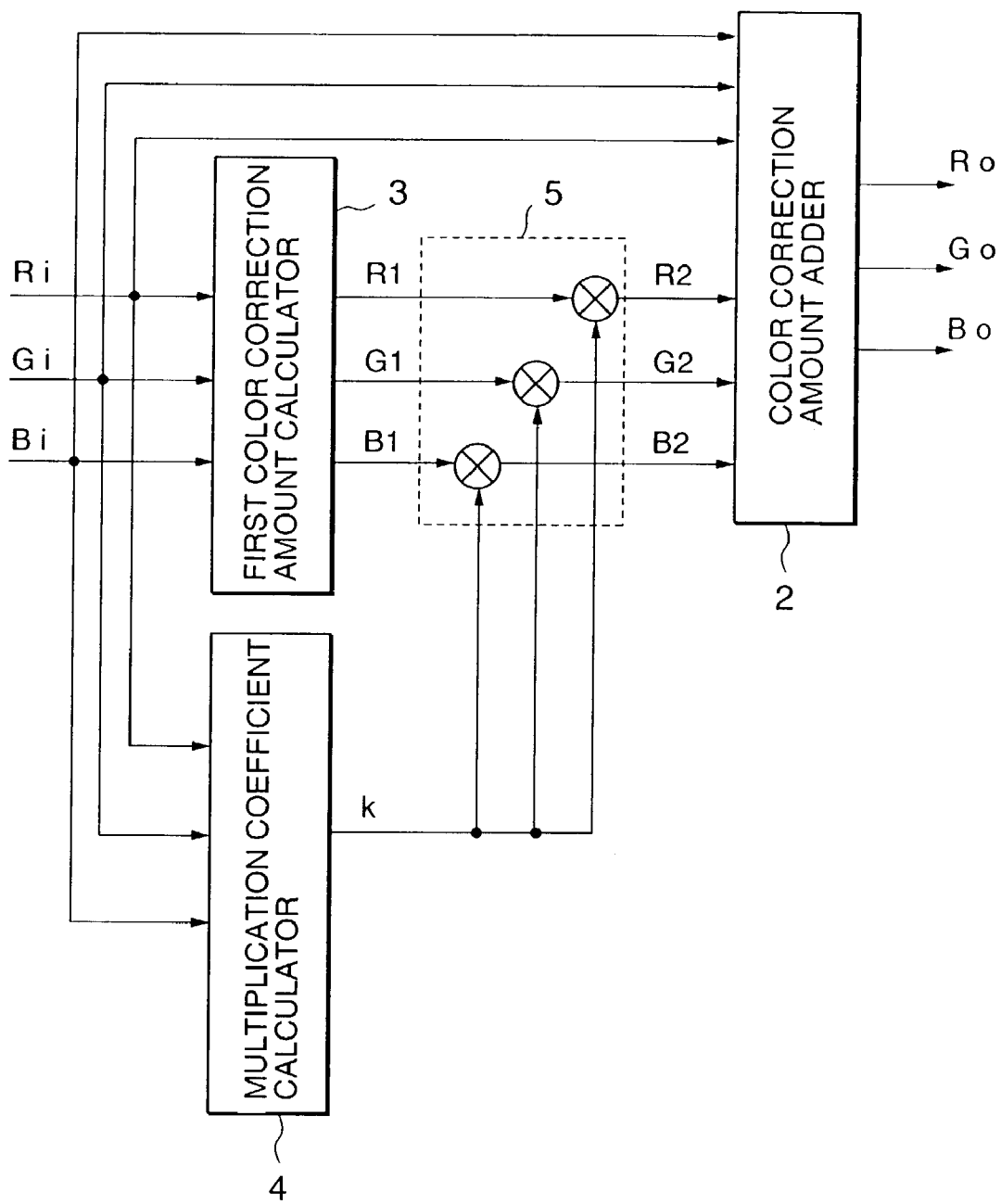
FIG. 1 is a block diagram showing an example of configuration of a color conversion device according to Embodiment 1 of the present invention.

FIG. 1 is a block diagram showing an example of configuration of a color conversion device according to an embodiment of the invention. The illustrated color conversion device is for performing color conversion on first image data consisting of a plurality of first color data Ri, Gi, Bi and constituting image information for each pixel, to produce second image data consisting of a plurality of second color data Ro, Go, Bo, and constituting image information for each pixel, and comprises a first color correction amount calculator 3, a multiplication coefficient calculator 4, a second color correction amount calculator 5, and a color correction amount adder 2.

The first color data Ri, Gi, Bi are input to the first color correction amount calculator 3. The first color correction amount calculator 3 calculates first color correction amounts R1, G1, B1 for the first color data Ri, Gi, Bi, and outputs the first color correction amounts R1, G1, B1 to the second color correction amount calculator 5. The configuration of the first color correction amount calculator 3 will be described later, but may be identical to the color correction amount calculator 1 in the conventional color conversion device.

The first color data Ri, Gi, Bi are also input to the multiplication coefficient calculator 4. The multiplication coefficient calculator 4 calculatesídetermines a multiplication coefficient k from the first color data Ri, Gi, Bi, and outputs the multiplication coefficient k to the second color correction amount calculator 5. The second color correction amount calculator 5 multiplies the first color correction amounts R1, G1, B1 by the multiplication coefficient k, to produce second color correction amounts R2, G2, B2, and outputs the second color correction amounts R2, G2, B2 to the color correction amount adder 2. The color correction amount adder 2 is supplied noto only with the second color correction amounts R2, G2, B2, but also the first color data Ri, Gi, Bi, and adds the second color correction amounts R2, G2, B2 to the first color data Ri, Gi, Bi, to produce the second color data Ro, Go, Bo. Accordingly, the second color data Ro, Go, Bo can be given by the following equation (9).

$$\begin{bmatrix} Ro \\ Go \\ Bo \end{bmatrix} = \begin{bmatrix} Ri \\ Gi \\ Bi \end{bmatrix} + k \begin{bmatrix} R1 \\ G1 \\ B1 \end{bmatrix} \quad (9)$$

Figure 2:
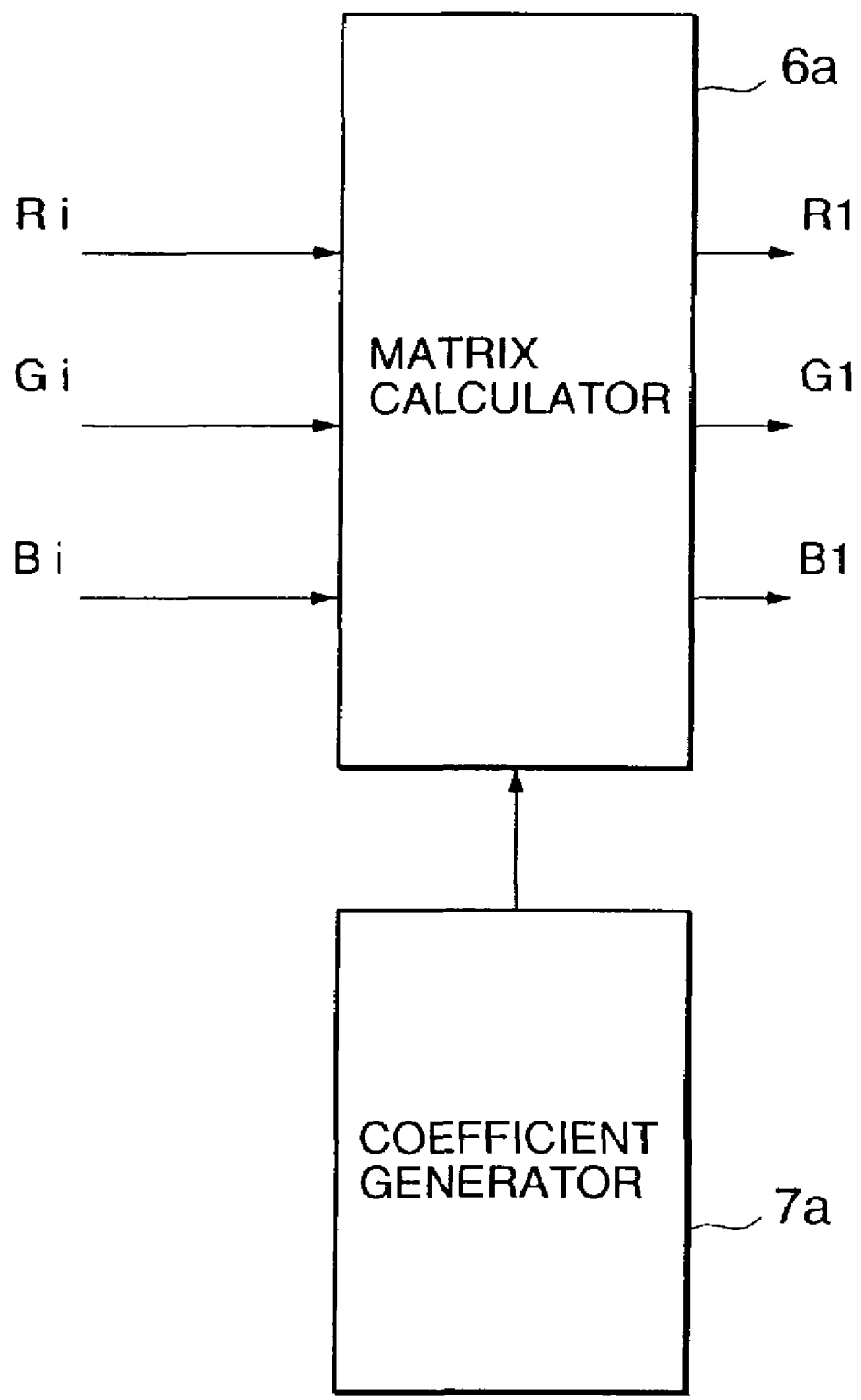
FIG. 2 is a block diagram showing an example of configuration of a first color correction unit 3 in the color conversion device according to Embodiment 1 of the present invention.

FIG. 2 is a block diagram showing an example of configuration of the first color correction amount calculator 3. In the drawing, reference numeral 6a denotes a matrix calculator, and 7a denotes a coefficient generator. The coefficient generator 7a generates coefficients (Gij) for matrix calculation, and sends them to the matrix calculator 6a. Here, i=1 to 3, j=1 to 3. The matrix calculator 6a performs the calculation according to the following equation (10) using the first color data Ri, Gi, Bi and the coefficients (Gij) from the coefficient generator, to produce the first color correction data R1, G1, B1. The calculation according to the equation (10) can be easily implemented using multipliers and adders.

$$\begin{bmatrix} R1 \\ G1 \\ B1 \end{bmatrix} = (Gij) \begin{bmatrix} Ri \\ Gi \\ Bi \end{bmatrix} \quad (10)$$

Figure 3:
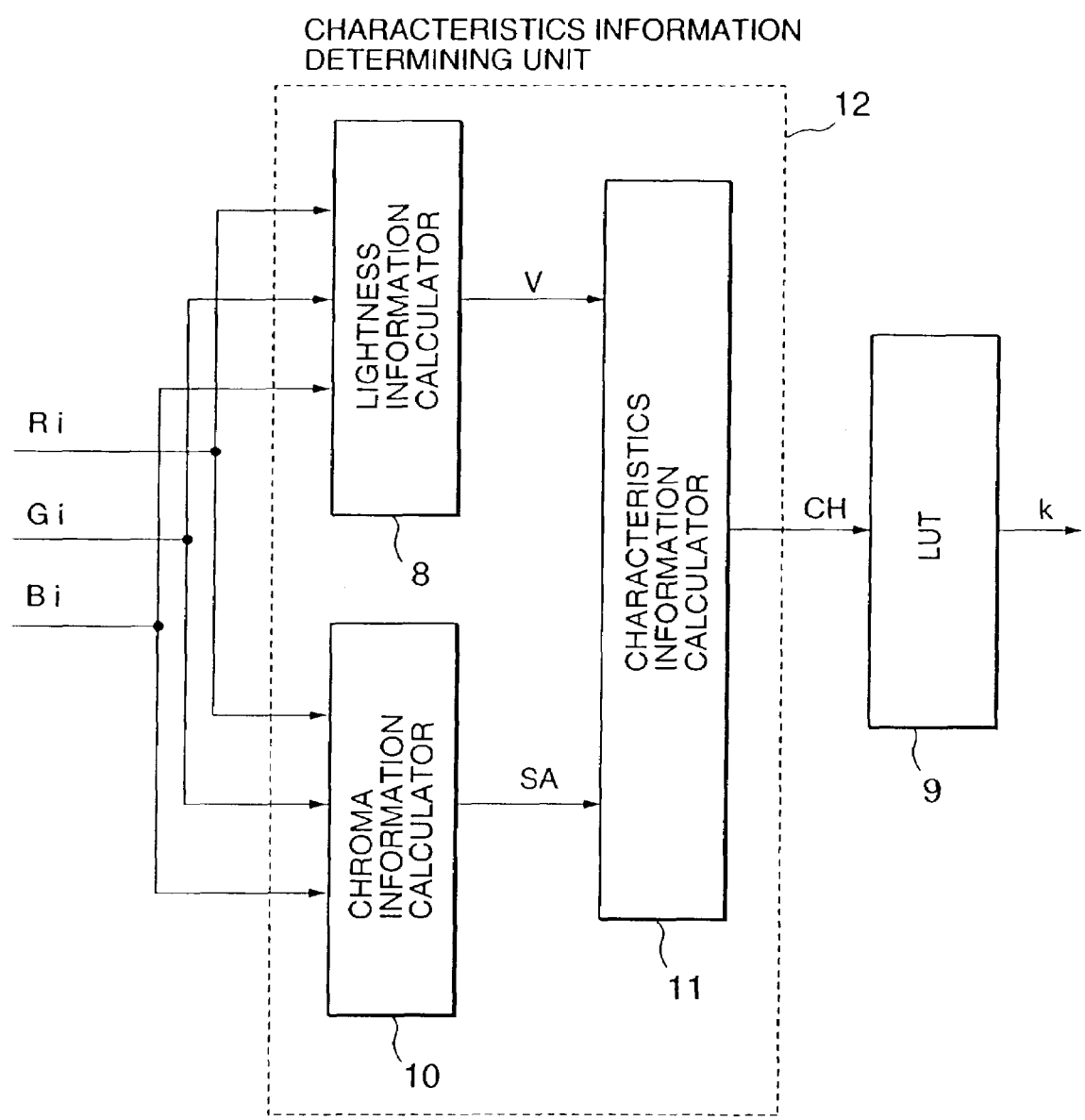
FIG. 3 is a block diagram showing an example of configuration of a multiplication coefficient calculator 4 in the color conversion device according to Embodiment 1 of the present invention.

FIG. 3 is a block diagram showing an example of configuration of the multiplication coefficient calculator 4. In the drawing, reference numeral 8 denotes a lightness information calculator, 9 denotes a look-up table (LUT), 10 denotes a chroma information calculator, 11 denotes a characteristics information calculator, and 12 denotes a characteristics information determining unit. The characteristics information determining unit 12 is supplied with the first color data Ri, Gi, Bi, and calculates characteristics information of Ri, Gi, Bi, and outputs the characteristics information CH to the look-up table 9.

The characteristics information determining unit 12 comprises the lightness information calculator 8, the chroma information calculator 10, and the characteristics information calculator 11. The first color data Ri, Gi, Bi input to the characteristics information determining unit 12 are input to the lightness information calculator 8 and the chroma information calculator 10. The lightness information calculator 8 calculates and outputs lightness information V representing the value or lightness of Ri, Gi, Bi. The chroma information calculator 10 calculates and outputs chroma information SA representing the saturation or chroma of Ri, Gi, Bi. The characteristics information calculator 11 calculates and outputs characteristics information CH by calculation according to the following equation (11).

$$CH = \frac{V + SA}{2} \quad (11)$$

The characteristics information CH given by the above equation (11) includes information of both the lightness information V and the chroma information SA. The division by 2 in the above equation (11) is made to adjust the numerical value level of the characteristics information CH, and is not essential.

The look-up table 9 is formed of a memory or the like, and stores the values of the multiplication coefficient k corresponding to the characteristics information CH at the memory locations (addresses) designated by the characteristics information CH. By inputting the characteristics information CH as the read address, the corresponding multiplication coefficient k is output.

Figure 4:
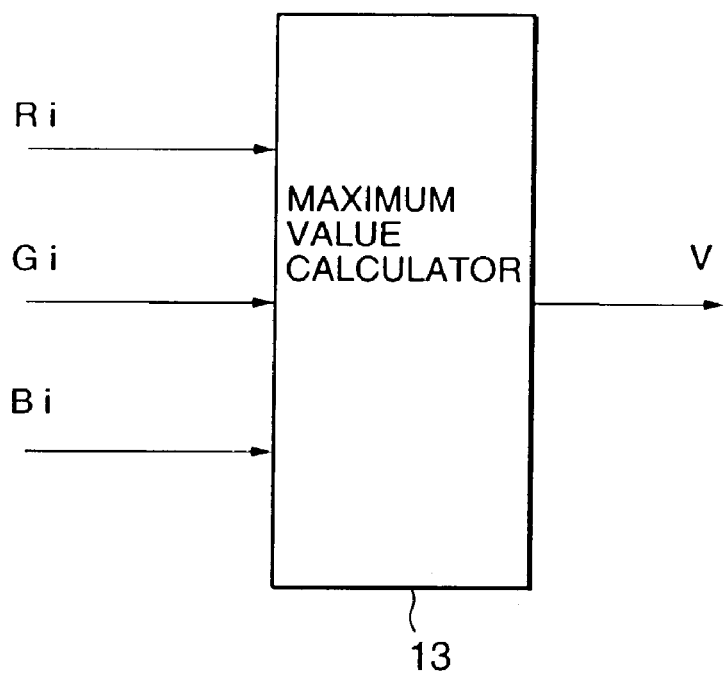
FIG. 4 is a block diagram showing an example of configuration of a lightness information calculator 8 in the color conversion device according to Embodiment 1 of the present invention.

FIG. 4 is a block diagram showing an example of configuration of the lightness information calculator 8 in the color conversion device according to Embodiment 1 of the invention. In the drawing, reference numeral 13 denotes a maximum value calculator. The maximum value calculator 13 is supplied with the first color data Ri, Gi, Bi, and outputs the maximum value of Ri, Gi, Bi as the lightness information V.

Figure 5:
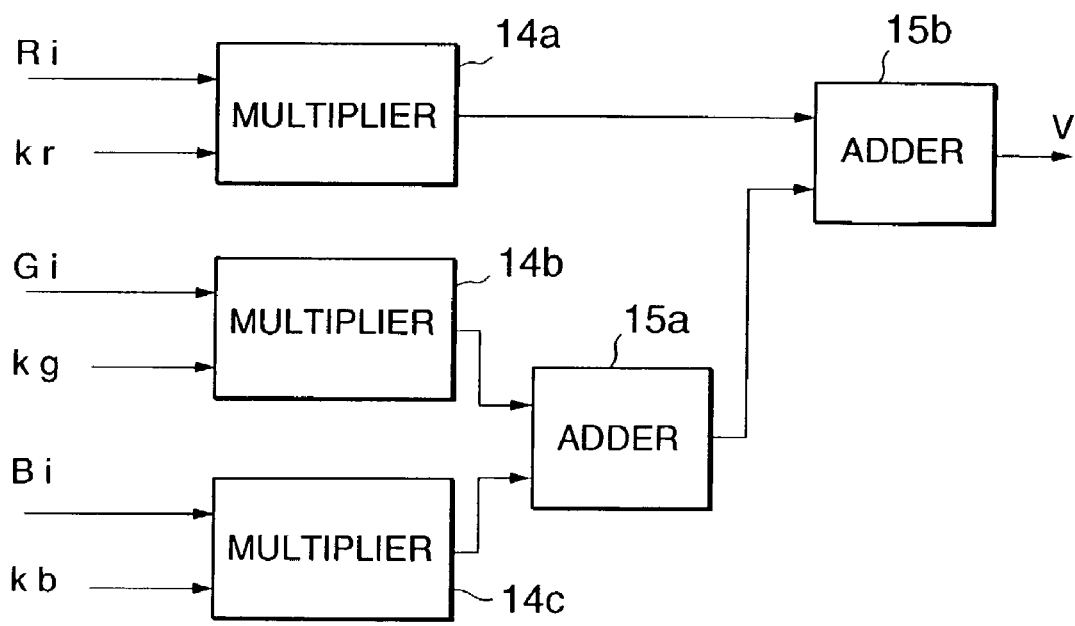
FIG. 5 is a block diagram showing another example of configuration of a lightness information calculator 8 in the color conversion device according to Embodiment 1 of the present invention.

The lightness information calculator 8 may be of a different configuration. FIG. 5 shows an example of another configuration of the lightness information calculator 8. In the drawing, reference numeral 14a, 14b, 14c denote multipliers, and 15a, 15b denote adders. The first color data Ri, Gi, Bi and the coefficients kr, kg, kb are input to the multipliers 14a, 14b, 14c, and the results of the multiplication are output. The outputs of the multipliers 14b and 14c are input to the adder 15a, and the result of addition is output. The output of the adder 14a and the output of the multiplier 14a are input to the adder 15b, and the result of addition is output as the lightness information V. The lightness information V determined by the lightness information calculator 8 shown in FIG. 5 is given by the following equation (12).

$$V = kr \times Ri + kg \times Gi + kb \times Bi \qquad (12)$$

When the first color data Ri, Gi, Bi is color data according to NTSC, the coefficients may be so set that kr=0.3, kg 0.59, kb=0.11 in the above equation (12). Also, if for instance, the coefficients are so set that kr=0.25, kg=0.5, kb=0.25, (because of the relationship $0.25 = 1/2^2$, $0.5 = \frac{1}{2}$), the multipliers 10a, 10b, 10c can be implemented by bit-shifting, so that the size of the circuit can be reduced.

When the configuration of the lightness information calculator 8 is as shown in FIG. 5, determinination of the sum of the first color data multiplied by the respective coefficients will result in the light information suitable to the human sense. The noise components contained in the first color data are generated without regard to the human sense, and the effects of the noise components on the first color data vary depending on the relative magnitude between the original color data components Rs, Gs, Bs and the noise components Rn, Gn, Bn. For instance, the effects of the noise components that result when noise components with Rn=20, Gn=20, Bn=40 are added to the original color data components with Rs=200, Gs=50, Bs=50, and the effects of the noise components that result when noise components with Rn=20, Gn=20, Bn=40 are added to the original color data components with Rs=50, Gs=200, Bs=50 are equal in the space of the color data. But when the lightness information calculator 8 is configured as shown in FIG. 5, the calculated lightness information V is different between the above two cases. If, on the other hand, the lightness information calculator 8 is configured as shown in FIG. 4, the calculated lightness information V is the same between the above two cases.

In the following description, it is assumed that the lightness information calculator 8 is configured as shown in FIG. 4, and the maximum value of the first color data Ri, Gi, Bi is output as the lightness information V.

Figure 6:
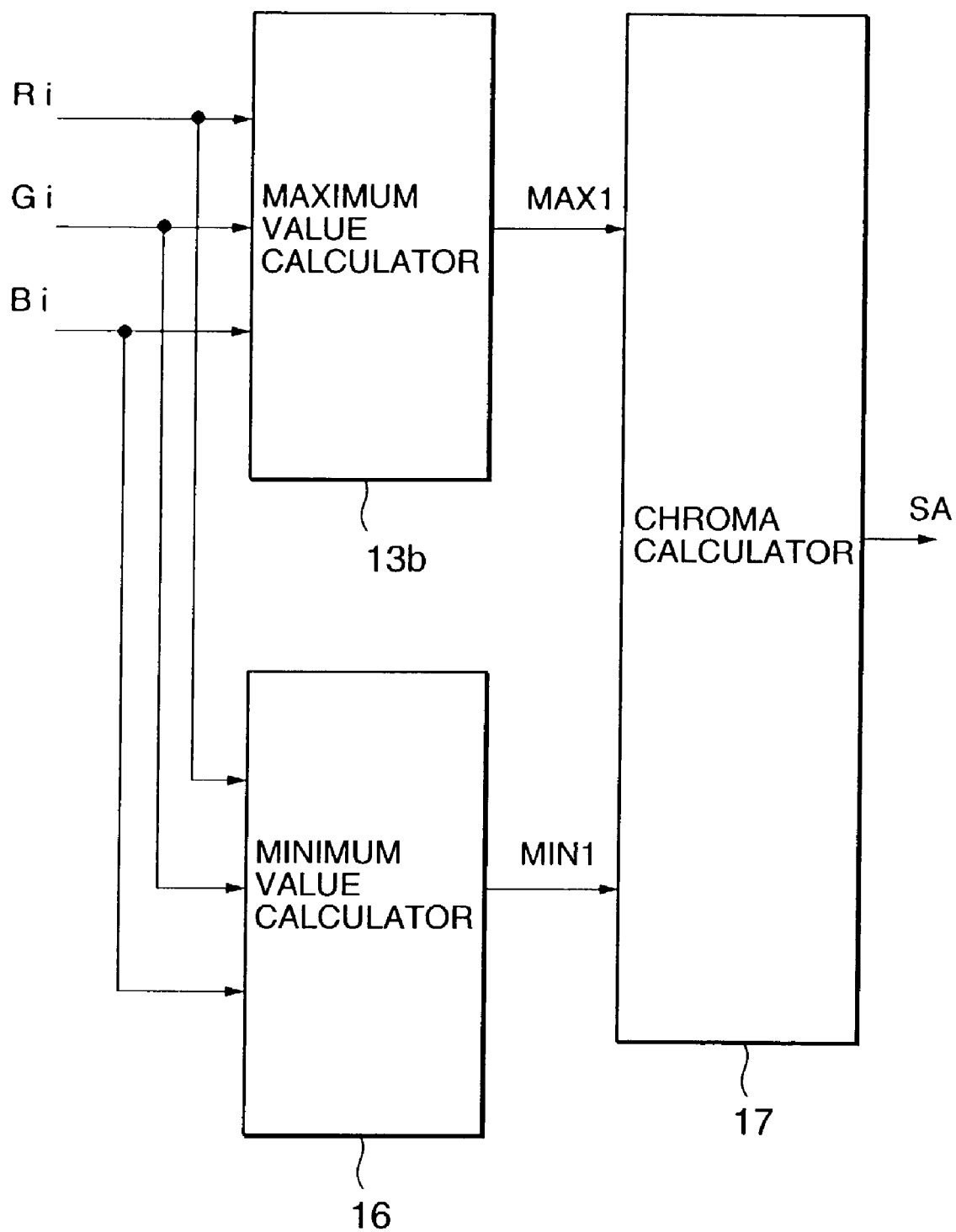
FIG. 6 is a block diagram showing an example of configuration of a chroma information calculator 10 in the color conversion device according to Embodiment 1 of the present invention.

FIG. 6 is a block diagram showing an example of configuration of the chroma information calculator 10. In the drawing, reference numeral 13b denotes a maximum value calculator, 16 denotes a minimum value calculator, and 17 denotes a chroma calculator. The first color data Ri, Gi, Bi are input to the maximum value calculator 13b and the minimum value calculator 16. The maximum value calculator 13b calculates and outputs the maximum value MAX1 of the first color data Ri, Gi, Bi. The minimum value calculator 16 calculates and outputs the minimum value MIN1 of the first color data Ri, Gi, Bi. The chroma calculator 17 calculates the chroma information SA by, for example, the following equation (13) using the maximum value MAX1 and the minimum value MIN1.

$$SA = (MAX1 - MIN1)/MAX1 \qquad (13)$$

For the first color data with Ri=255, Gi=0, Bi 0, the chroma information is given by SA 1.0; while for the first color data with Ri=128, Gi=64, Bi=64, the chroma information is given by SA=0.5.

In the calculation shown by the above equation (13), the chroma information can be calculated without being influenced by the lightness information, but a division is necessary. This means increase in the size of the circuit in the case of hardware implementation, or increase in the processing time in the case of software implementation. In order to avoid the increase in the size of the circuit or the time of processing, calculation according to the following equation (14) may be used in place of the calculation according to the equation (13) to calculate the chroma information SA.

$$SA = (MAX1 - MIN1) \qquad (14)$$

In this case, for the first color data with Ri=255, Gi=0, Bi=0, the chroma information is given by SA=255, while for the first color data with Ri=128, Gi=64, Bi=64, the chroma information is given by SA=64. In the following description, it is assumed that the chroma calculator 17 calculates the chroma information SA according to the above equation (14).

By the above described operation, the characteristics information determining unit 12 calculates and outputs the characteristics information CH. The characteristics information CH output from the characteristics information determining unit 12 is supplied to the look-up table 9. The look-up table 9 outputs the multiplication coefficient k corresponding to the value of the input characteristics information CH. The above is the operation of the multiplication coefficient calculator 4.

The second color correction amount calculator 5 multiplies the first color correction amounts R1, G1, B1 by the multiplication coefficient k output from the multiplication coefficient calculator 4, to produce the second color correction amounts R2, G2, B2. The second color correction amounts R2, G2, B2 are added at the color correction amount adder 2 to the first color data Ri, Gi, Bi, resulting in the second color data Ro, Go, Bo.

The color conversion device according to the present embodiment calculates the second color data Ro, Go, Bo by the above described operation. The relationship between the multiplication coefficient k stored in the look-up table 9 and the characteristics information CH is now described. First, let us assume that the first color data Ri, Gi, Bi assume any integer of from 0 to 255. In the color conversion device under consideration, the lightness information V is calculated as the maximum value of the first color data Ri, Gi, Bi in the lightness information calculator 8 shown in FIG. 4, and the chroma information SA is calculated by the equation (14). As a result, the lightness information V and the chroma information SA also assume an integer of from 0 to 255. Moreover, since the characteristics information CH is calculated by the calculation according to the above equation (11), the characteristics information CH also assumes an integer of from 0 to 255. On the other hand, the multiplication coefficient k is assumed to have a value of from 0 to 1 (0, 1 or a fractional figure (fraction of a unity).

Figure 7:
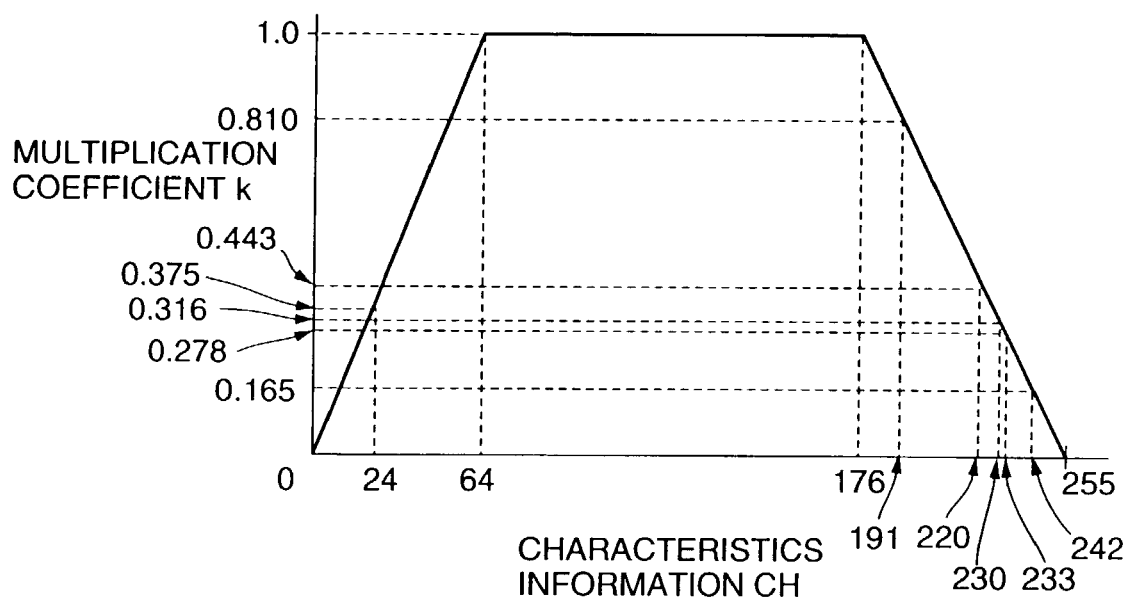
FIG. 7 is a graph showing an example of relationship between the characteristics information CH and the multiplication coefficient k stored in the look-up table 9 in the color conversion device according to Embodiment 1 of the present invention.

FIG. 7 is a graph showing an example of the relationship between the multiplication coefficient k stored in the look-up table 9, and the characteristics information CH. When CH=0, k=0. With increase in the value of the characteristics information CH, the value of the multiplication coefficient k increases linearly, reaching "1," when CH=64. For the value of the characteristics information CH of from 64 to 176, the value of k is kept at "1." For the value of the characteristics information CH of from 176 to 255, the value of the multiplication coefficient k decreases linearly with the increase in the value of the characteristics information CH, and reaches "0," when CH=255.

The relationship between the multiplication coefficient k and the characteristics information CH shown in FIG. 7 is such that, in the dark parts of the image where the original color data components Rs, Gs, Bs is small and effects of noise components Rn, Gn, Bn are strong, and in parts of the image of a high chroma or of a high lightness where color contraction tends to occur, the multiplication coefficients used for multiplication with the first color correction amounts is made small, to restrain the degree of emphasis of the color in the color conversion.

The first color data Ri, Gi, Bi is the sum of the original color data components Rs, Gs, Bs and the noise components Rn, Gn, Bn. If Rs=192, Gs=64, Bs=64, and Rn=8, Gn=8, Bn=24, then the first color data is such that Ri=200, Gi=72, Bi=88. While the original color data components Rs, Gs, Bs represent a red color, the first color data Ri, Gi, Bi represent a slightly bluish red due to the effect of the noise components Rn, Gn, Bn. Then, the lightness information is given by V=MAX(Ri,Gi,Bi)=200, and the chroma information is given by SA=MAX(Ri,Gi,Bi)−MIN(Ri,Gi,Bi)=112, so that the characteristics information is given by CH=(V+SA)/2=156, and the multiplication coefficient is given by k=1.0.

On the other hand, if Rs=24, Gs=8, Bs=8, and Rn=8, Gn=8, Bn=24, then the first color data is such that Ri=32, Gi=16, Bi=32. While the original color data component Rs, Gs, Bs represent a red color, the first color data Ri, Gi, Bi represent magenta, with the hue being changed substantially, due to the effect of the noise components Rn, Gn, Bn. Then the lightness information is given by V=MAX(Ri,Gi,Bi)=32, the chroma information is given by SA=MAX(Ri,Gi,Bi)−MIN(Ri,Gi,Bi)=16, so that the characteristics information is given by CH=(V+SA)/2=24, and the multiplication coefficients is given by k=0.375.

The multiplication coefficient k is multiplied with the first color correction amounts to produce the second color correction amounts. With the smaller multiplication coefficients, the amounts of correction in the color conversion are smaller. When processing to increase the chroma of the color is performed, the degree of emphasis of the color is smaller with the smaller multiplication coefficient.

When the original color data components Rs, Gs, Bs are small, and the effects of the noise components Rn, Gn, Bn are strong, as are in the dark parts of the image, the lightness information of the first color data tends to be small. Because the characteristics information CH contains the lightness information of the first image data, decrease in the lightness information of the first color data leads to decrease in the characteristics information CH. Accordingly, it is possible to carry out such a processing in which the multiplication coefficient k is calculated from the characteristics information CH, so as to reduce the multiplication coefficient k multiplied with the first color correction amounts, thereby to restrain the degree of emphasis of the color by the color conversion, when the effects of the noise components Rn, Gn, Bn are stronger, while enlarging the multiplication coefficient k multiplied with the first color correction amounts, thereby to emphasize the color by the color conversion, when the effects of the noise components Rn, Gn, Bn are not so strong.

Moreover, according to the color conversion device of the present invention, it is also possible to restrain the occurrence of color contraction in the light color parts by the use of the multiplication coefficient k having a specific relationship with the characteristics information CH.

As was described earlier, the matrix calculator 6a calculates the first color correction data R1, G1, B1 by the calculation according to the following equation (10) using the first color data Ri, Gi, Bi and the coefficients (Gij) from the coefficient generator.

$$\begin{bmatrix} R1 \\ G1 \\ B1 \end{bmatrix} = (Gij) \begin{bmatrix} Ri \\ Gi \\ Bi \end{bmatrix} \quad (10)$$

It is assumed that the coefficients given by the following equation (15) are used in the above equation (10).

$$(Gij) = \begin{bmatrix} 0.2 & -0.1 & -0.1 \\ -0.1 & 0.2 & -0.1 \\ -0.1 & -0.1 & 0.2 \end{bmatrix} \quad (15)$$

Let us consider a situation in which the color data with Ri=230, Gi=20, Bi=20 are input. In this case, the lightness information is given by V=MAX(Ri,Gi,Bi)=230, and has a high lightness. The chroma information is given by SA=MAX(Ri,Gi,Bi)−MIN(Ri,Gi,Bi)=210. The characteristics information is therefore given by CH=(V+SA)/2=220, and the multiplication coefficient is given by k=0.443. Also, R1=42, G1=−21, B1=−21. Here, the fractional part (the digits to the right of the decimal point) has been rounded. Accordingly, the second color data are given by Ro=249, Go=11, Bo=11.

When the color data with Ri=240, Gi=15, Bi=15 are input, the lightness information is given by V=MAX(Ri,Gi,Bi)=240, and has a high lightness. The chroma information is given by SA=MAX(Ri,Gi,Bi)−MIN(Ri,Gi,Bi)=225. The characteristics information is therefore given by CH=(V+SA)/2=233, and the multiplication coefficient is given by k=0.278. Also, R1=45, G1=−23, B1=−23. Here, the fractional part has been rounded. Accordingly, the second color data are given by Ro=253, Go=9, Bo=9.

In the conventional color conversion device, the values of Ro, Go, Bo obtained when the color data with Ri=230, Gi=20, Bi=20 are input, and the values of Ro, Go, Bo obtained when the color data with Ri=240, Gi=15, Bi=15 are input are identical, i.e., color contraction occurs. In contrast, the color conversion device according to the present embodiment is not suffered from the color contraction. It is understood from the above that the color conversion device and the color conversion method of the present embodiment can perform color conversion while avoiding color contraction in the high-lightness parts of the image.

Moreover, according to the color conversion device of the present invention, it is also possible to restrain the occurrence of color contraction in the parts of high chroma by the use of the multiplication coefficient k having a specific relationship with the characteristics information CH.

As was described above, the matrix calculator 6a calculates the first color correction data R1, G1, B1 by calculation according to the following equation (10) using the first color data Ri, Gi, Bi, and the coefficients (Gij) from the coefficient generator.

$$\begin{bmatrix} R1 \\ G1 \\ B1 \end{bmatrix} = (Gij) \begin{bmatrix} Ri \\ Gi \\ Bi \end{bmatrix} \quad (10)$$

In the above equation (10), the coefficients shown by the following equation (16) are assumed to be used.

$$(Gij) = \begin{bmatrix} 0.2 & -0.2 & -0.2 \\ -0.2 & 0.2 & -0.2 \\ -0.2 & -0.2 & 0.2 \end{bmatrix} \quad (16)$$

Here, for the input of Ri=255, Gi=128, Bi=128, the resultant first color correction amounts will be given by R1=0, G1=−51, B1=−51. The fractional part has been rounded. In this case, the lightness information is given by V=MAX(Ri,Gi,Bi)=255, and the chroma information is given by SA=MAX(Ri,Gi,Bi)−MIN(Ri,Gi,Bi)=127, so that the characteristics information is given by CH=(V+SA)/2=191, and the multiplication coefficient is given by k=0.810. Accordingly, the second color data are given by Ro=255, Go=87, Bo=87. The chroma SAo of the second color data Ro, Go, Bo will be 168, and the chroma of the color data is thus increased by the color conversion.

Let us now consider a situation where the color data of Ri=255, Gi=26, Bi=26 are input. Then, the lightness information is given by V=MAX(Ri,Gi,Bi)=255, and the chroma information is given by SA=MAX(Ri,Gi,Bi)−MIN(Ri,Gi,Bi)=229, so that the characteristics information is given by CH=(V+SA)/2=242, and the multiplication coefficient is given by k=0.165. Moreover, the first color correction amounts will be given by R1=41, G1=−51, B1=−51. Accordingly, the second color data are given by Ro=255, Go=18, Bo=18. As a result, the chroma SAo of the second color data Ro, Go, Bo will be 237.

Let us now consider a situation where the color data of Ri=255, Gi=51, Bi=51 are input. Then, the lightness information is given by V=MAX(Ri,Gi,Bi)=255, and the chroma information is given by SA=MAX(Ri,Gi,Bi)−MIN(Ri,Gi,Bi)=204, so that the characteristics information is given by CH=(V+SA)/2=230, and the multiplication coefficient is given by k=0.316. Moreover, the first color correction amounts are given by R1=31, G1=−51, B1=−51. Accordingly, the second color data are given by Ro=255, Go=35, Bo=35. As a result, the chroma SAo of the second color data Ro, Go, Bo will be 220.

In the conventional color conversion device, the values of Ro, Go, Bo obtained when the color data of Ri=255, Gi=26, Bi=26 are input, and the values of Ro, Go, Bo obtained when the color data of Ri=255, Gi=51, Bi=51 are input are identical with each other, and color contraction occurred. In contrast, the color conversion device according to the present embodiment is free from such color contraction.

As has been described, according to the color conversion device and color conversion method of the present embodiment, it is possible to perform color conversion by which color contraction in the high-chroma parts of the image can be avoided, even when a processing to increase the chroma of the color data is applied.

In the present embodiment, a look-up table is used as a unit for determining the multiplication coefficient k from the characteristics information CH. But logical operation circuits or the like may be used instead. When a look-up table is used, various characteristics can be realized freely by rewriting the contents of the table. Moreover, the look-up table used as a means for determining the multiplication coefficient k from the characteristics information CH is a one-dimensional table, and does not require such a large capacity as is required in the case of a three-dimensional table.

The relationship between the multiplication coefficient k and the characteristics information CH shown in FIG. 7 is just an example. For instance, the gradient in of increase of the multiplication coefficient k in the region where the characteristics information CH is small is arbitrary, and the increase of the multiplication coefficient k need not be linear. If the gradient of increase of the multiplication coefficient k in the region where the characteristics information CH is small is gentle, there will be larger effects of restraining the emphasis of the effects of noises in the dark parts of the image, while the effects of the processing at the color conversion unit, i.e., the effects of increasing the chroma or lightness, are reduced. Also, the gradient of decrease of the multiplication coefficient k in the region where the characteristics information CH is large is also arbitrary, and the decrease of the multiplication coefficient k need not be linear. If the gradient of decrease in the region where the characteristics information CH is large is gentle, there will be larger effects of restraining the emphasis of the effects of noises in the dark parts or high-chroma parts of the image, while the effects of the processing at the color conversion unit, i.e., the effects of increasing the chroma or lightness are reduced.

Figure 8:
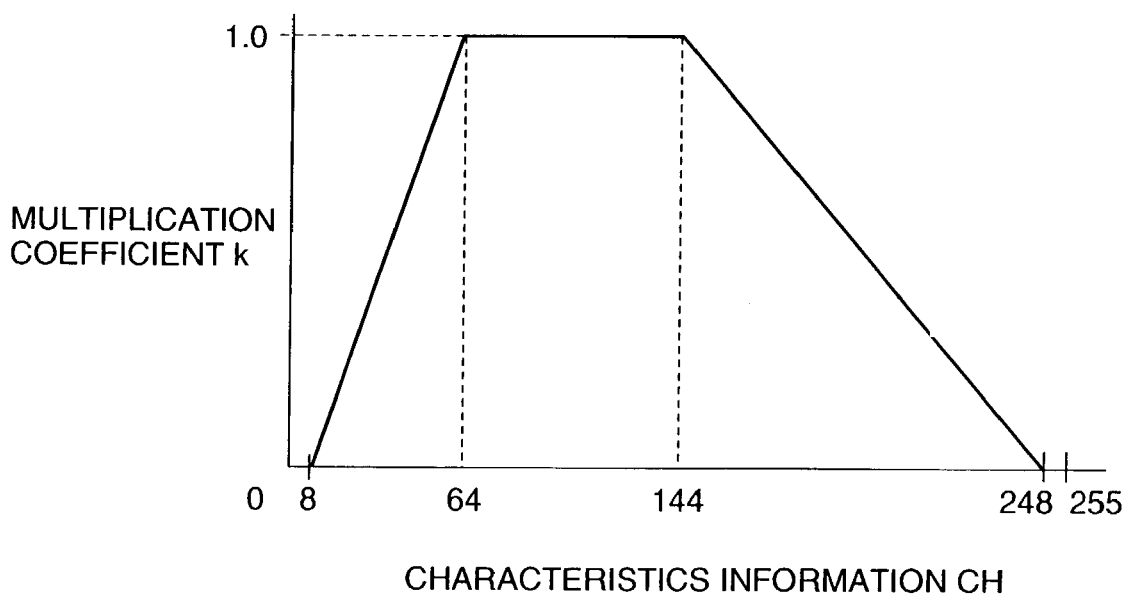
FIG. 8 is a graph showing another example of relationship between the characteristics information CH and the multiplication coefficient k stored in the look-up table 9 in the color conversion device according to Embodiment 1 of the present invention.

FIG. 8 shows another example of the relationship between the multiplication coefficient k and the characteristics information CH. For the range of CH=0 to CH=8, the multiplication coefficient is kept at "0." In the range in excess of CH=8, the value of the multiplication coefficient k increases linearly with increase in the value of the characteristics information CH, and reaches "1," when CH=64. In the range of the value of the characteristics information CH of from 64 to 144, the multiplication coefficient k is kept at "1." In the range of the value of the characteristics information CH of from 144 to 248, the value of the multiplication coefficient k decreases linearly with increase in the value of the characteristics information CH. In the range of CH=248 to CH=255, the multiplication coefficient k is kept at "0."

Figure 9:
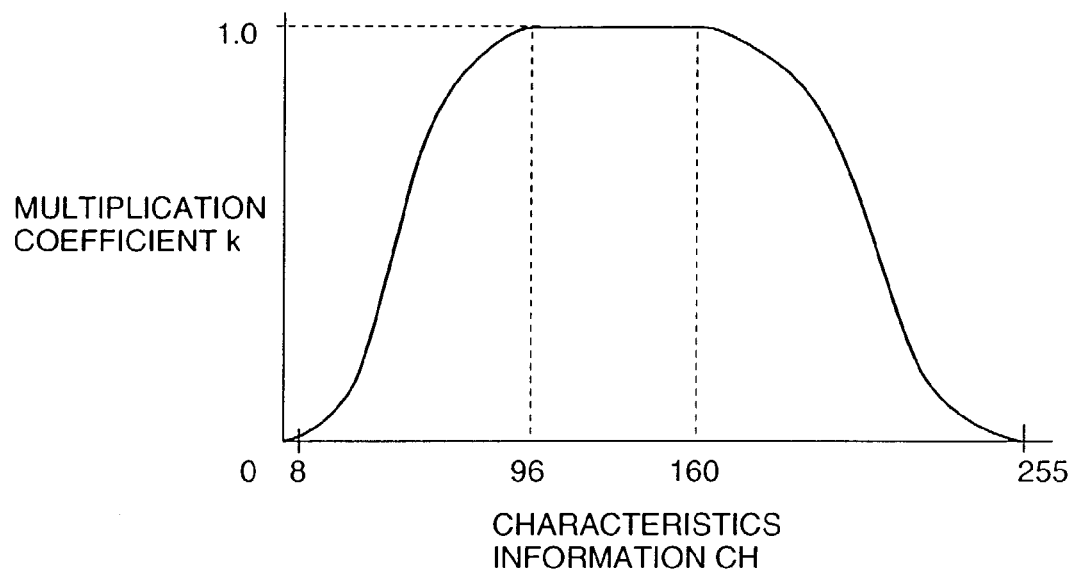
FIG. 9 is a graph showing yet another example of relationship between the characteristics information CH and the multiplication coefficient k stored in the look-up table 9 in the color conversion device according to Embodiment 1 of the present invention.

FIG. 9 shows a further example of the relationship between the multiplication coefficient k and the characteristics information CH. When the characteristics information CH is "0," the multiplication coefficient k is at "0." In the range of from CH=8 to CH=96, the value of the multiplication coefficient k increases non-linearly, with the increase in the value of the characteristics information CH, and reaches "1," when CH=96. In the range of the value of the characteristics information CH of from 96 to 160, the multiplication coefficient k is given by "1." In the range of the value of the characteristics information CH of from 160 to 255, the value of the multiplication coefficient k decreases non-linearly, with the increase in the value of the characteristics information CH. When the characteristics information CH is "255," the multiplication coefficient k is "0."

The above embodiment has been described on the assumption that the device is implemented mainly by hardware. But similar functions are obtained even when the device is implemented by software. Moreover, in the embodiment described, the first color data consist of three color data representing red, green and blue. The invention is applicable to situations where the first color data consist of four or more color data. In such a case, the characteristics information CH can be determined from the four or more color data.

Embodiment 2.

Figure 10:
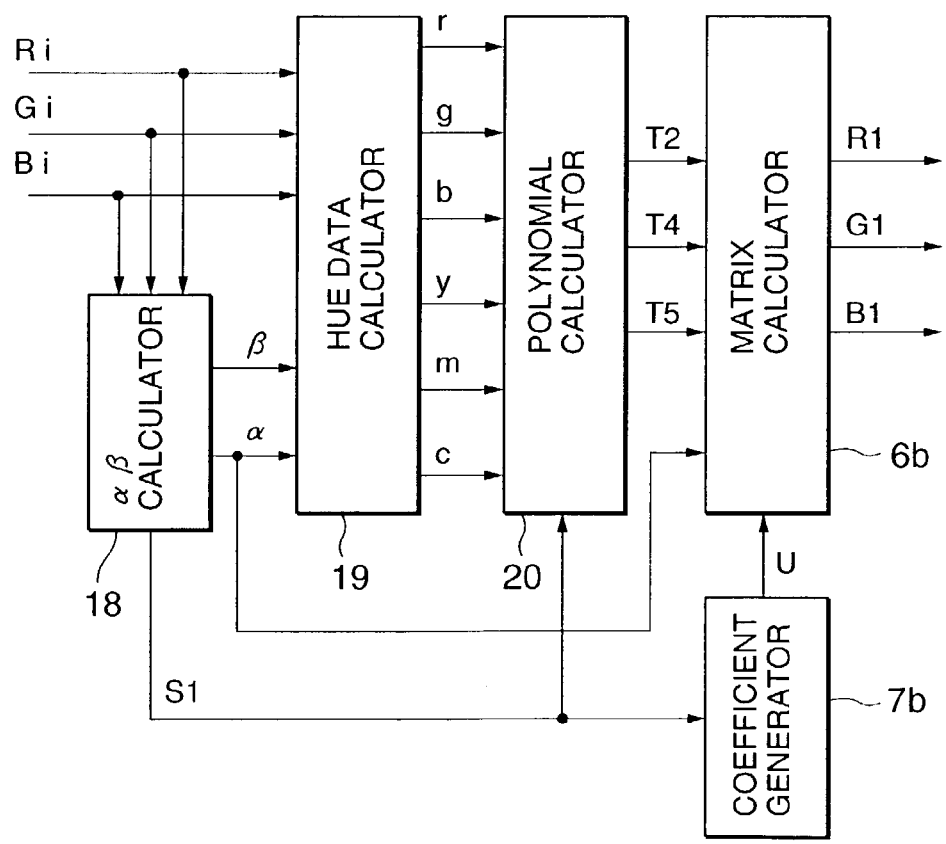
FIG. 10 is a block diagram showing an example of configuration of a first color correction unit 3 in the color conversion device according to Embodiment 2 of the present invention.

FIG. 10 is a block diagram showing another example of configuration of first color correction amount calculator 3 in a color conversion device according to Embodiment 1 of the present invention. In the drawing, reference numeral 18 denotes an αβ calculator calculating and outputting a maximum value β and a minimum value α of the input first color data first color data Ri, Gi, Bi, and generating and outputting an identification code indicating which of the first color data is the maximum and which of the first color data is the minimum. Reference numeral 19 denotes a hue data calculator calculating hue data r, g, b, y, m, c from the first color data Ri, Gi, Bi and the outputs of the αβ calculator 1. Reference numeral 20 denotes a polynomial calculator, 6b denotes a matrix calculator, and 7b denotes a coefficient generator.

Figures 11, 12, 13:
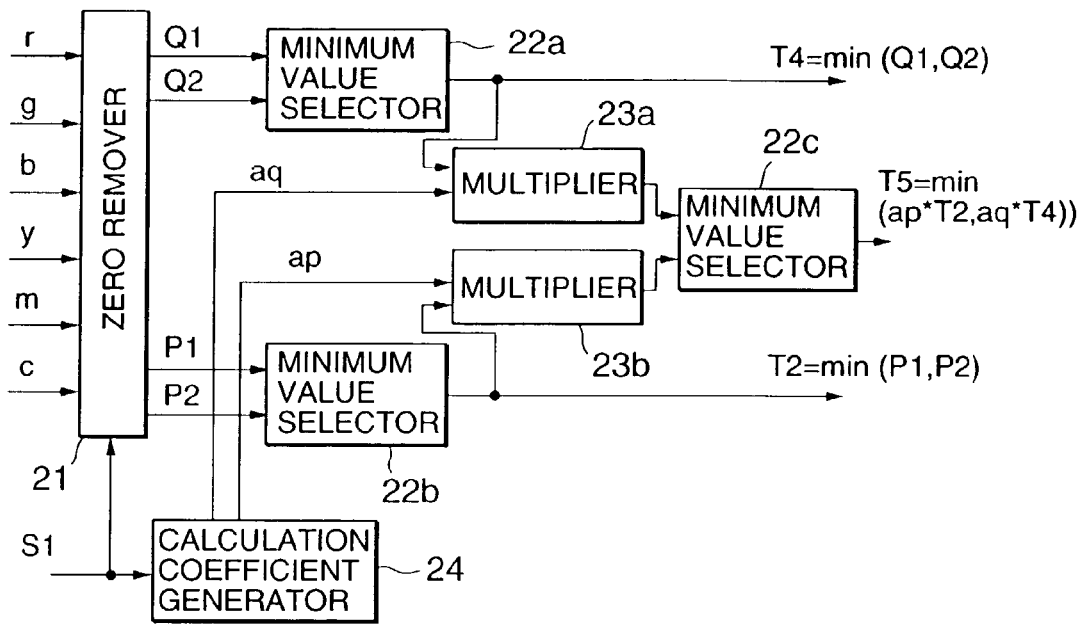
FIG. 11 is a block diagram showing an example of configuration of a polynomial calculator 20 in the color conversion device according to Embodiment 2 of the present invention.
FIG. 12 illustrates an example of the relationship between the identification code S1, and the maximum value β and the minimum value α, and the hue data that are zero, in the color conversion device according to Embodiment 2 of the present invention.
FIG. 13 is a drawing for explaining the operation of the zero remover in the polynomial calculator 20 in the color conversion device according to Embodiment 2 of the present invention.

FIG. 11 is a block diagram showing an example of configuration of the polynomial calculator 20. In the drawing, reference numeral 21 denotes a zero remover for removing those of the input hue data which are zero. Reference numerals 22a, 22b, 22c denote minimum value selectors for selecting and outputting the respective minimum values of the input data. Reference numeral 24 denotes a calculation coefficient generator generating and outputting calculation coefficients based on the identification code from the αβ calculator 1. Reference numerals 23a, 23b denote multipliers multiplying the outputs of the minimum value selectors 22a and 22b, by the respective calculation coefficients represented by the outputs of the calculation coefficient generator 24.

The operation is next described. The input first color data Ri, Gi, Bi are supplied to the αβ calculator 18 and the hue data calculator 19. The αβ calculator 18 calculates and outputs the maximum value β and the minimum value α of the first color data Ri, Gi, Bi, and generates and outputs the identification code S1 which indicates which of the first color data Ri, Gi, Bi is the maximum and which of the first color data Ri, Gi, Bi is the minimum.

The hue data calculator 19 receives the first color data Ri, Gi, Bi, and the maximum value β and the minimum value α output from the αβ calculator 18, and performs the following subtraction:

$r=Ri-\alpha$, $g=Gi-\alpha$, $b=Bi-\alpha$, and $y=\beta-Bi$, $m=\beta-Gi$, $c=\beta-Ri$ and outputs the six hue data r, g, b, y, m, c.

Because the maximum value β and the minimum value a calculated at the αβ calculator 18 are given by:

$\beta=MAX(Ri,Gi,Bi)$, $\alpha=MIN(Ri,Gi,Bi)$, and the six hue data r, g, b, y, m, c calculated at the hue data calculator 19 are obtained by the subtraction:

$r=Ri-\alpha$, $g=Gi-\alpha$, $b=Bi-\alpha$, and $y=\beta-Bi$, $m=\beta-Gi$, $c=\beta-Ri$, the six hue data have such a characteristics that at least two of them are zero.

For instance, if Ri is the maximum, and G1 is the minimum, (β=Ri, α=Gi), the above subtraction leads to g=0 and c=0. If Ri is the maximum and Bi is the minimum, (β=Ri, α=Bi), the above subtraction leads to b=0 and c=0.

That is, at least one of r, g, b is zero, and at least one of y, m, c is zero, and at least two in total are zero, and which of them are zero depends on the combination of Ri, Gi or Bi which is the maximum, and Ri, Gi or Bi which is the minimum.

Accordingly, the αβ calculator 18 generates and outputs the identification code S1 indicating which of the hue data are zero. The identification code S1 assumes one of six values depending on which of Ri, Gi, Bi is the maximum and which of Ri, Gi, Bi is the minimum. FIG. 12 shows the relationship between the identification code S1, the maximum value β and minimum value α of Ri, Gi, Bi, and the hue data that are zero. The value of the identification code S1 shown in FIG. 12 is just an example, and the identification code may assume other values.

The six hue data r, g, b, y, m, c output from the hue data calculator 19 are supplied to the polynomial calculator 20. The polynomial calculator 20 is also supplied with the identification code S1 from the αβ calculator 18, and performs calculation using two non-zero data Q1, Q2 among r, g, b and two non-zero data P1, P2 among y, m, c.

This operation is described with reference to FIG. 11.

The hue data from the hue data calculator 19 and the identification code S1 from the αβ calculator are input to the zero remover 21 in the polynomial calculator 20. Based on the identification code S1, the zero remover 21 outputs two non-zero data of r, g, b as Q1, Q2, and two non-zero data of y, m, c as P1, P2. The data Q1, Q2, P1, P2 are determined as shown in FIG. 13, and output. For instance, when the identification code S1=0, r, b are used as Q1, Q2, and y, m are used as P1, P2, as will be seen from FIG. 12 and FIG. 13, and Q1=r, Q2, =b, P1=m, P2=y are output. Like FIG. 12, the values of the identification code S1 in FIG. 13 are just an example, and the values of the identification code S1 are not limited to those shown in FIG. 13.

The minimum value selector 22a selects and outputs the minimum value T4=min (Q1, Q2) of the output data Q1, Q2 of the zero remover 21, while the minimum value selector 22b selects and outputs the minimum value T2=min (P1, P2) of the output data P1, P2 of the zero remover 21. The data T4 and T2 output from the minimum value selectors 22a and 22b constitute the first arithmetic terms.

The calculation coefficient generator 24 is supplied with the identification code S1 from the αβ calculator 18, and generates, based on the identification code S1, signals representing calculation coefficients aq, ap used for multiplication with the first arithmetic terms T4 and T2 at the multipliers 23a, 23b, and supplies the calculation coefficient aq to the multiplier 23a and the calculation coefficient ap to the multiplier 235b.

The values of the calculation coefficients aq, ap vary depending on the identification code Si. That is, as the identification code S1 has six values as shown in FIG. 13, each of the calculation coefficients aq, ap has six values corresponding to the six values of the identification code Si. The multiplier 23a receives the first arithmetic term T4 from the minimum value selector 22a, and performs multiplication (aq×T4) of the first arithmetic term T4 with the calculation coefficient aq from the calculation coefficient generator 24, and supplies the output (product) to the minimum value selector 22c. The multiplier 23b receives the first arithmetic term T2 from the minimum value selector 22b, and performs multiplication (ap×T2) of the first arithmetic term T2 with the calculation coefficient ap from the calculation coefficient generator 24, and supplies the output (product) to the minimum value selector 22c.

The minimum value selector 22c selects and outputs the minimum value T5=min (ap×T2, aq×T4) of the outputs of the multipliers 23a and 23b. The output T5 of the minimum value selector 22c constitutes the second arithmetic term. The polynomial data T2, T4, T5 described above are the outputs of the polynomial calculator 20. The outputs of the polynomial calculator 20 are supplied to the matrix calculator 6b.

The coefficient generator 7b shown in FIG. 10 generates calculation coefficients U(Fij) for the polynomial data, based on the identification code S1, and supplies the generated coefficients to the matrix calculator 6b. The matrix calculator 6b receives the polynomial data T2, T4, T5 from the polynomial calculator 20, the minimum value α from the αβ calculator 18, and the coefficients U from the coefficient generator 7b, performs matrix calculation in accordance with the following equation (17), and outputs the results of the calculation as the first color correction amounts R1, G1, B1.

$$\begin{bmatrix} R1 \\ G1 \\ B1 \end{bmatrix} = (Fij) \begin{bmatrix} T2 \\ T4 \\ T5 \\ \alpha \end{bmatrix} \quad (17)$$

In the equation (17), for (Fij), i=1 to 3, j=1 to 4.

Figure 14:
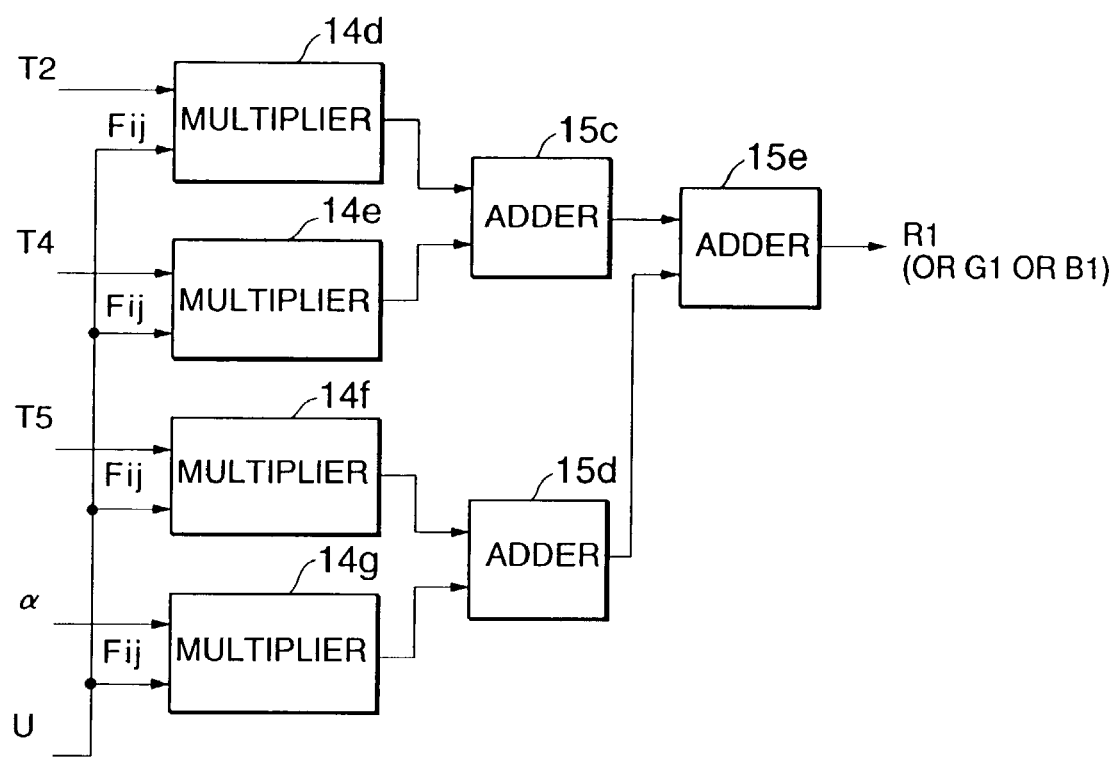
FIG. 14 is a block diagram showing an example of configuration of part of a matrix calculator 6g in the color conversion device according to Embodiment 2 of the present invention.
Figure 15A:
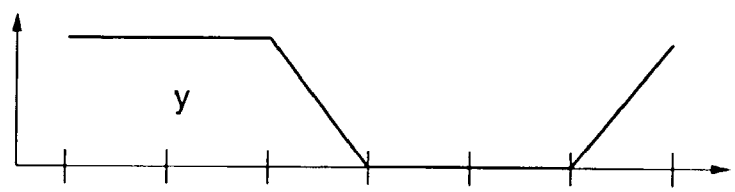
FIG. 15A to FIG. 15F schematically illustrate the relationship between the six hues and the hue data.
Figure 15B:
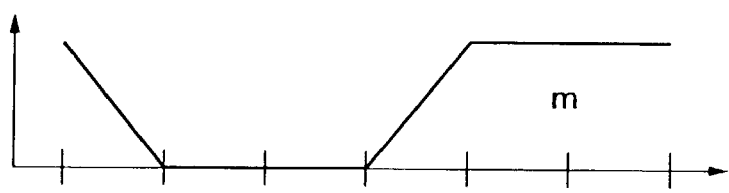
Figure 15C:
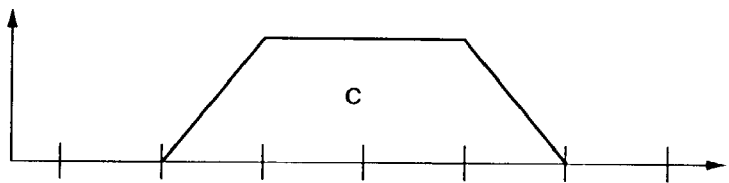
Figure 15D:
Figure 15E:
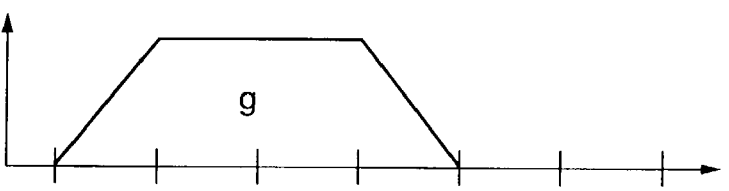
Figure 15F:
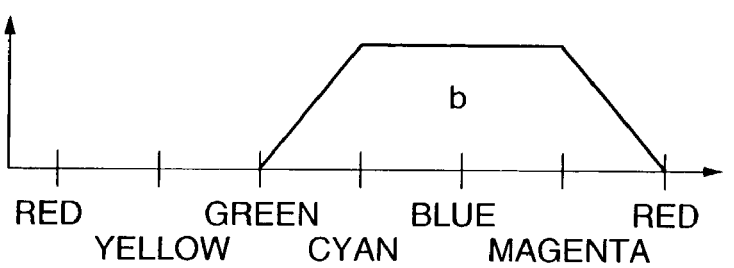
Figure 16A:
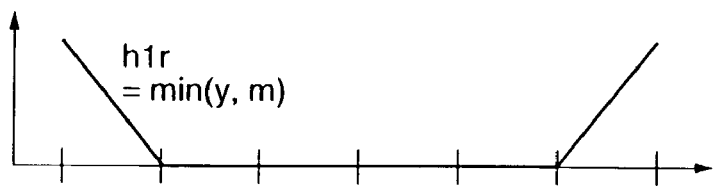
FIG. 16A to FIG. 16F schematically illustrate the relationship between the first arithmetic terms and the hues in the color conversion device according to Embodiment 2 of the present invention.
Figure 16B:
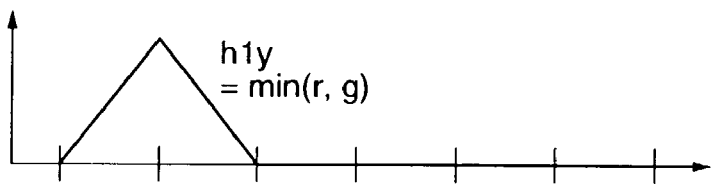
Figure 16C:
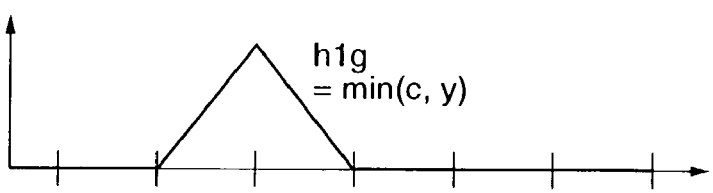
Figure 16D:
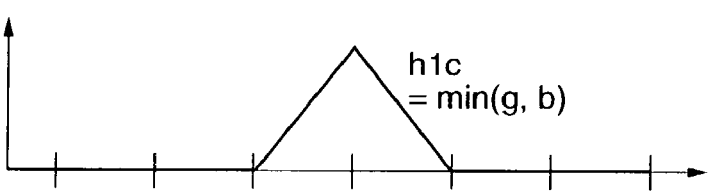
Figure 16E:
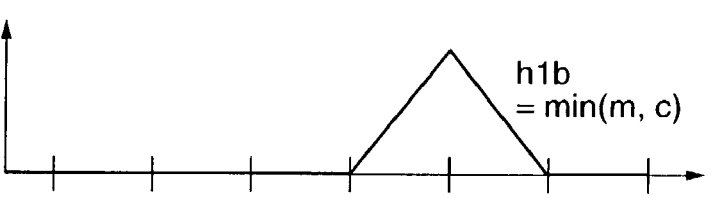
Figure 16F:
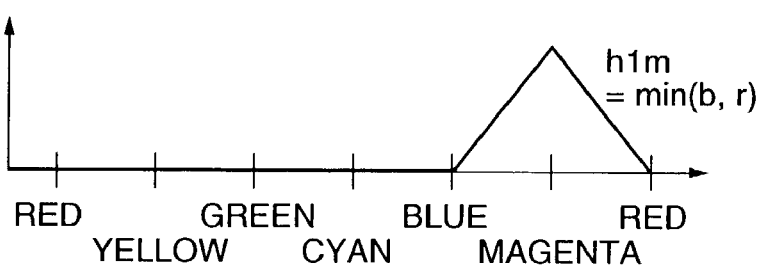
Figure 17A:
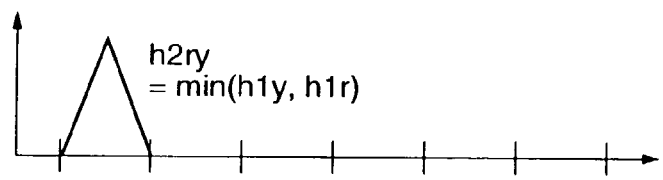
FIG. 17A to FIG. 17F schematically illustrate the relationship between the second arithmetic terms and the hues in the color conversion device according to Embodiment 2 of the present invention.
Figure 17B:
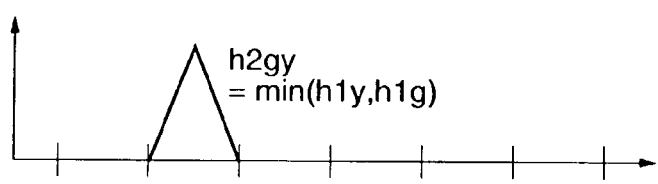
Figure 17C:
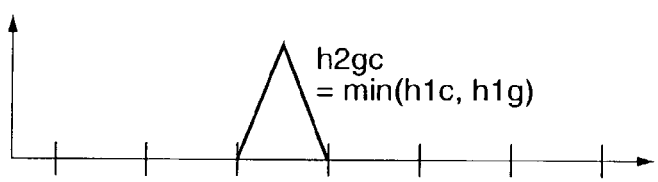
Figure 17D:
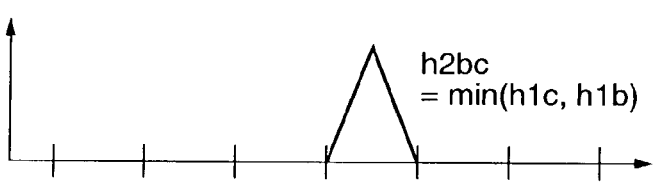
Figure 17E:
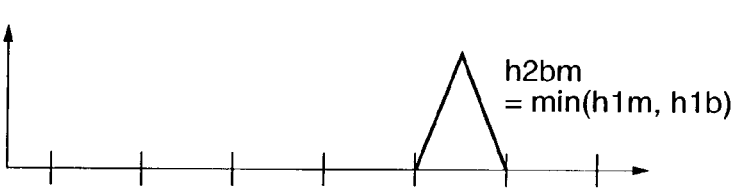
Figure 17F:
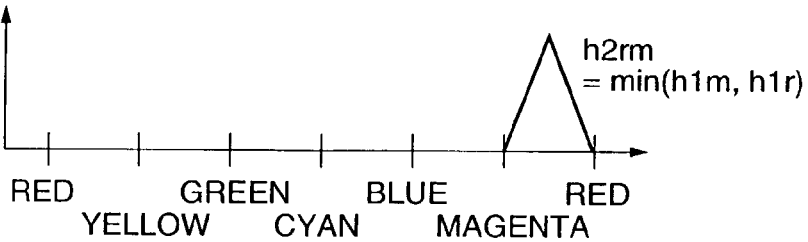

FIG. 14 is a block diagram showing an example of part of the matrix calculator 6b, which calculates R1. In the drawing, reference numerals 14d to 14g denote multipliers, and 15c to 15e denote adders.

The operation of the circuit shown in FIG. 14 will next be described. The multipliers 14d to 14g receive the polynomial data T2, T4, T5 from the polynomial calculator 20, the minimum value α from the αβ calculator 18 and the coefficients U(Fij) from the coefficient generator 7b, and output the respective products.

The adders 15c, 15d receive the products output from the multipliers 14d to 14g, add the input data, and output the respective sums. The adder 15e adds the data from the adders 15c, 15d, and outputs their sum as the first color correction amount R1.

The same configuration as that shown in FIG. 14 can be used to calculate the first color data G1, B1. If three configurations each identical to that shown in FIG. 14 are used in parallel for the first color correction amounts R1, G1, B1, the matrix calculation can be achieved at a high speed.

Incidentally, as the coefficients (Fij), those corresponding to the first color correction amounts R1, G1, B1 are used.

Accordingly, the equation for calculating the first color correction amounts R1, G1, B1 by means of the first color correction amount calculator shown in FIG. 10 is the following equation (18).

$$\begin{bmatrix} R1 \\ G1 \\ B1 \end{bmatrix} = (Fij) \begin{bmatrix} h1r \\ h1g \\ h1b \\ h1c \\ h1m \\ h1y \\ h2ry \\ h2rm \\ h2gy \\ h2gc \\ h2bm \\ h2bc \\ \alpha \end{bmatrix} \quad (18)$$

Here, for (Fij), i=1 to 3, j=1 to 13, $h1r=\min(m, y)$, $h1g=\min(y, c)$, $h1b=\min(c, m)$, $h1c=\min(g, b)$, $h1m=\min(b, r)$, $h1y=\min(r, g)$, $h2ry=\min(aq1 \times h1y, ap1 \times h1r)$, $h2rm=\min(aq2 \times h1m, ap2 \times h1r)$, $h2gy=\min(aq3 \times h1y, ap3 \times h1g)$, $h2gc=\min(aq4 \times h1c, ap4 \times h1g)$, $h2bm=\min(aq5 \times h1m, ap5 \times h1b)$, $h2bc=\min(aq6 \times h1c, ap6 \times h1b)$ where aq1 to aq6, and ap1 to ap6 are calculation coefficients generated by the calculation coefficient generator 24 shown in FIG. 11.

The difference between the number of arithmetic terms between the equation (18) and the number of arithmetic terms in FIG. 10 is due to the fact that FIG. 10 discloses the method of calculation for each pixel, excluding the arithmetic terms having a value zero, while the equation (18) represents a general formula for the entire set of pixels.

That is, the number of polynomial data (the first arithmetic terms, and the second arithmetic terms) can be reduced from "thirteen" in the equation (18) to "four" if we look at just one pixel, and this reduction is achieved by utilizing the nature of the hue data.

The combination of the effective data is altered depending on the image data of the pixel in question, and for the entire image data containing all the colors, all polynomial data will be effective.

FIG. 15A to FIG. 15F schematically illustrate the relationship between the six hues and the hue data y, m, c, r, g, b. Each hue data relates to three hues.

The equation (18) contains six first arithmetic terms each of which is effective for just one hue. The first arithmetic terms are:

$h1r=\min(y, m)$, $h1y=\min(r, g)$, $h1g=\min(c, y)$, $h1c=\min(g, b)$, $h1b=\min(m, c)$, $h1m=\min(b, r)$.

FIG. 16A to FIG. 16F schematically illustrate the relationship between the six hues and the first arithmetic terms $h1r$, $h1y$, $h1g$, $h1c$, $h1b$, $h1m$. Each of the first arithmetic terms relates to just one specific hue. For instance, assuming that W is a constant, for red, r=W, and g=b=0, so that y=m=W, c=0.

Accordingly, $h1r=\min(y, m)=W$, and other five first arithmetic terms are all zero. That is, for red, $h1r=\min(y, m)$ is the only effective first arithmetic term. Similarly, for green, $h1g=\min(c, y)$ is the only effective first arithmetic term; for blue, $h1b=\min(m, c)$ is the only effective first arithmetic term; for cyan, $h1c=\min(g, b)$ is the only effective first arithmetic term; for magenta, $h1m=\min(b, r)$ is the only effective first arithmetic term; and for yellow, $h1y=\min(r, g)$ is the only effective first arithmetic term. This also means that $h1r=\min(y, m)$ is effective just for red, and $h1g=\min(c, y)$, $h1b=\min(m, c)$, $h1c=\min(g, b)$, $h1m=\min(b, r)$, and $h1y=\min(r, g)$ are respectively effective just for green, blue, cyan, magenta, and yellow.

FIG. 17A to FIG. 17F schematically illustrate the relationship between the six hues and the second arithmetic terms $h2ry=\min(h1y, h1r)$, $h2gy=\min(h1y, h1g)$, $h2gc=\min(h1c, h1g)$, $h2bc=\min(h1c, h1b)$, $h2bm=\min(h1m, h1b)$, $h2rm=\min(h1m, h1r)$, with the calculation coefficients aq1 to aq6 and ap1 to ap6 in $h2ry=\min(aq1 \times h1y, ap1 \times h1r)$, $h2gy=\min(aq3 \times h1y, ap3 \times h1g)$, $h2gc=\min(aq4 \times h1c, ap4 \times h1g)$, $h2bc=\min(aq6 \times h1c, ap6 \times h1b)$, $h2bm=\min(aq5 \times h1m, ap5 \times h1b)$, $h2rm=\min(aq2 \times h1m, ap2 \times h1r)$ in the equation (18) being assumed to be "1."

It is seen from each of FIG. 17A to FIG. 17F, that each of the second arithmetic terms relates to change in an intermediate region in an inter-hue zone between adjacent ones of the six hues red, yellow, green, cyan, blue, and magenta, i.e., in an intermediate region in one of the six inter-hue zones red-yellow, yellow-green, green-cyan, cyan-blue, blue-magenta, and magenta-red. That is, for red-yellow, b=c=0, so that five terms other than $h2ry=\min(h1y, h1r)=\min(\min(r, g), \min(y, m))$ are all zero.

Accordingly, h2ry is only the effective second arithmetic term. Similarly, for yellow-green, h2gy is the only effective second arithmetic term; for green-cyan, h2gc is the only effective second arithmetic term; for cyan-blue, h2bc is the only effective second arithmetic term; for blue-magenta, h2bm is the only effective second arithmetic term; and for magenta-red, h2rm is the only effective second arithmetic term. This also means that h2ry is effective just for red-yellow, and h2gy, h2gc, h2bc, h2bm, and h2rm are respectively effective just for yellow-green, green-cyan, cyan-blue, blue-magenta, and magenta-red.

FIG. 18A to FIG. 18F schematically illustrate the relationship between the six hues and the second arithmetic terms, with the calculation coefficients aq1 to aq6, and ap1 to ap6 in the hry, hrm, hgy, hgc, hbm, and hbc in the equation (18) being varied. The broken lines a1 to a6 in the drawing show the characteristics for the cases where aq1 to aq6 are greater than ap1 to ap6, while the broken lines b1 to b6 shows the characteristics for the cases where ap1 to ap6 are greater than aq1 to aq6.

Figure 18A:
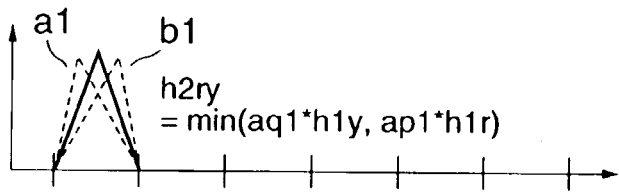
FIG. 18A to FIG. 18F schematically illustrate the relationship between the second arithmetic terms and the hues in the color conversion device according to Embodiment 2 of the present invention, with the calculation coefficients being varied at the calculation coefficient generator 24 in the polynomial calculator 20.
Figure 18B:
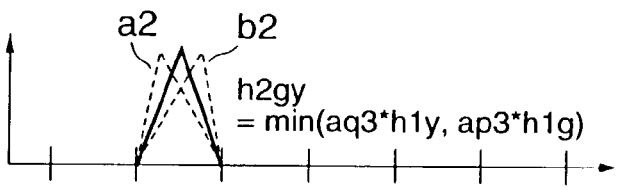
Figure 18C:
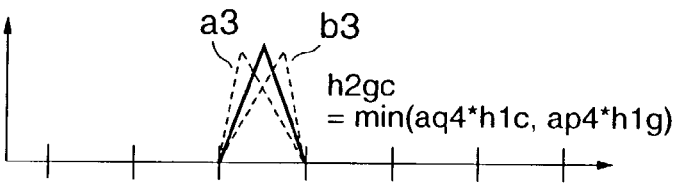
Figure 18D:
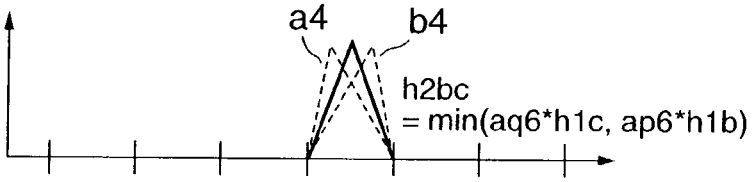
Figure 18E:
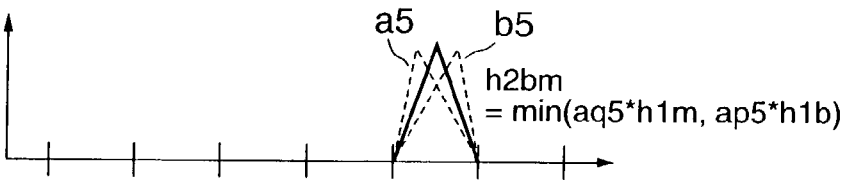
Figure 18F:
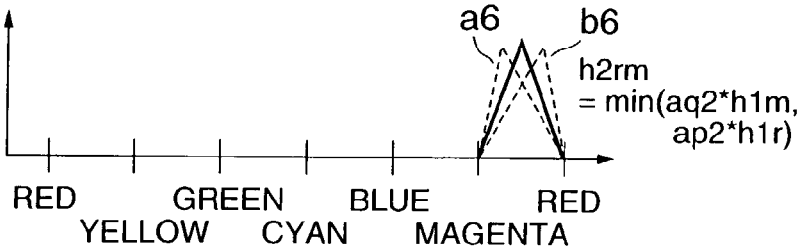
Figure 20A:
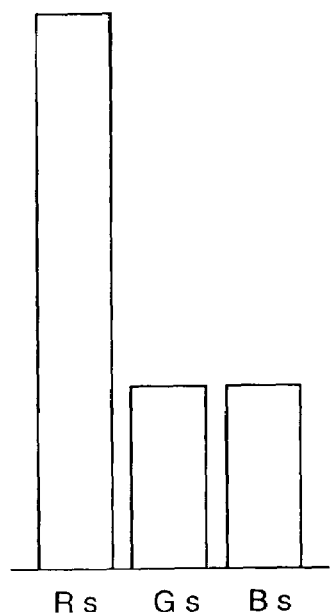
FIG. 20A to FIG. 20C show an example of original color data components Rs, Gs, Bs, noise components Rn, Gn, Bn, and color data Ri, Gi, Bi input to the image display device, in a situation in which the noise components Rn, Gn, Bn are smaller than the original color data components Rs, Gs, Bs.
Figure 20B:
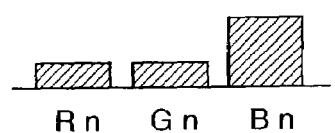
Figure 20C:
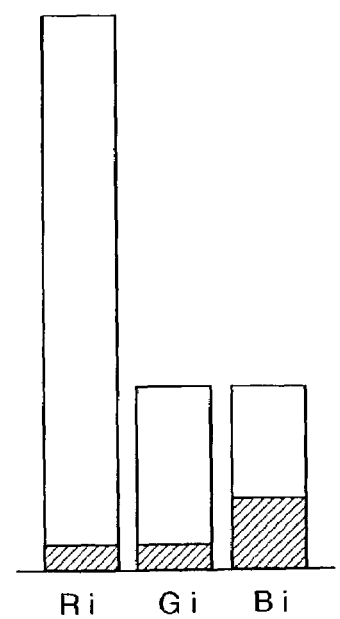
Figure 21A:
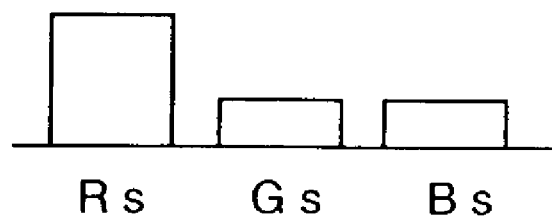
FIG. 21A to FIG. 21C show an example of original color data components Rs, Gs, Bs, noise components Rn, Gn, Bn, and color data Ri, Gi, Bi input to the image display device, in a situation in which the noise components Rn, Gn, Bn are larger than the original color data components Rs, Gs, Bs.
Figure 21B:
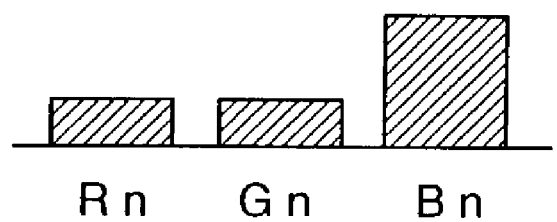
Figure 21C:
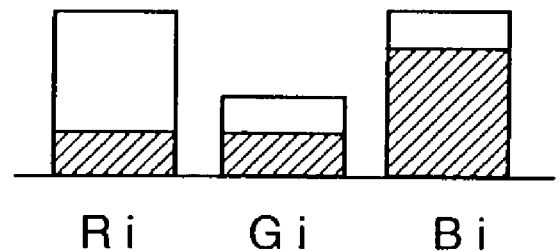
Figure 22:
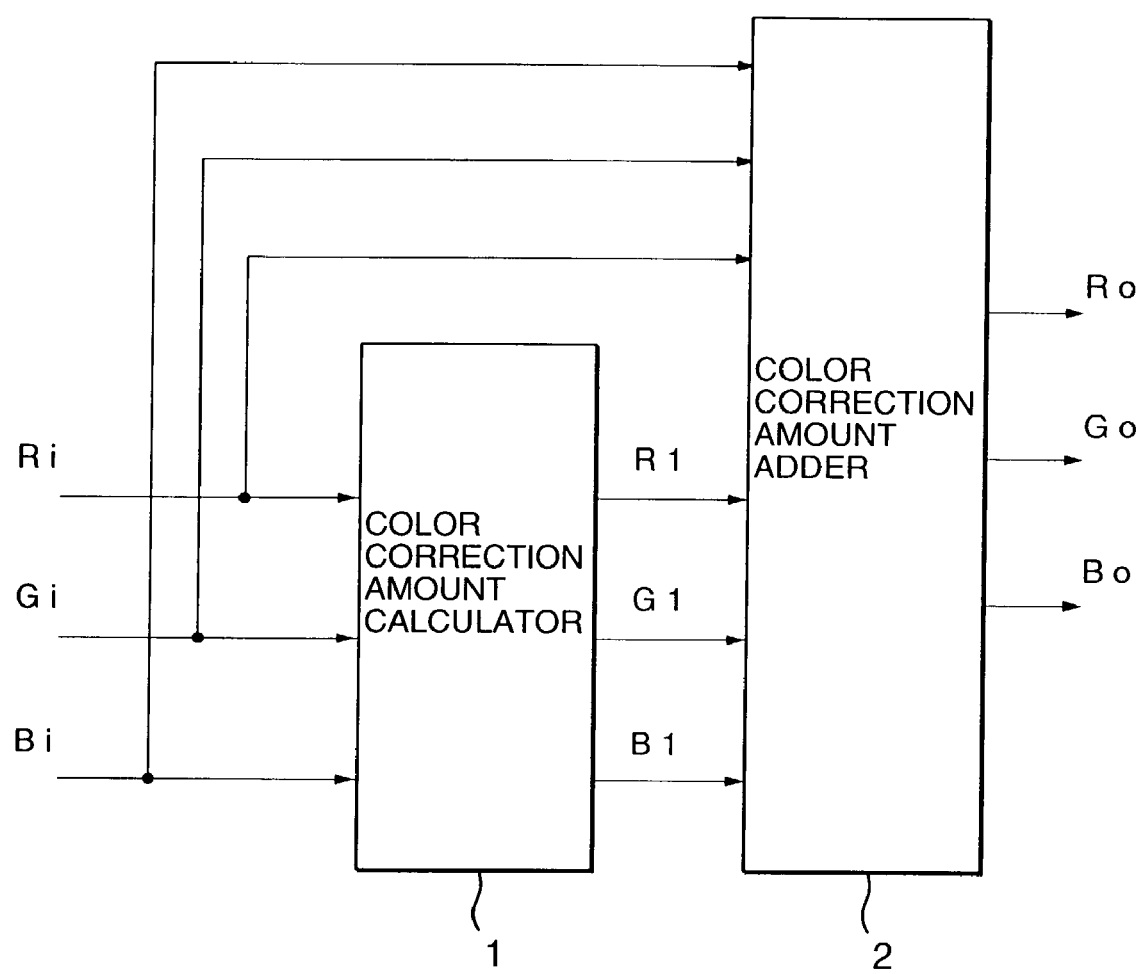
FIG. 22 is a block diagram showing an example of a conventional color conversion device.

For example, for red-yellow, $h2ry=\min(aq1 \times h1y, ap1 \times h1r)$ is the only effective second arithmetic term as mentioned above, and if the ratio between aq1 and ap1 is 2:1, the resultant arithmetic term has its peak value closer to red, as shown by the broken lines a1 in FIG. 18A, and is therefore effective for a region closer to red, within the inter-hue zone red-yellow. If, on the other hand, the ratio between aq1 and ap1 is 1:2, the arithmetic term has its peak value closer to yellow as shown by the broken lines b1 in FIG. 18A, and is therefore effective for a region closer to yellow, within the inter-hue zone red-yellow. Similarly, the region for which the arithmetic term is effective within each inter-hue zone can be shifted by varying aq3, ap3 in h2gy for yellow-green, aq4, ap4 in h2gc for green-cyan;

aq6, ap6 in h2bc for cyan-blue;

aq5, ap5 in h2bm for blue-magenta; and aq2, ap2 in h2rm for magenta-red.

FIG. 19A and FIG. 19B show the relationship between the six hues and inter-hue zones, and effective arithmetic terms. By varying the coefficients for the arithmetic terms effective for the hue or a region in the inter-hue zone which it is desired to adjust, by means of the coefficient generator 7b, only the hue in question can be adjusted, and the degree in the change in the inter-hue zones can be corrected, and the degree in change in the inter-hue zone can also be adjusted. Moreover, by varying the coefficients at the calculation coefficient generator 24 in the polynomial calculator 20, it is possible to vary the region within the inter-hue zone, at which the arithmetic term is effective without affecting other hues.

As has been described, when the first color correction amount calculator of this embodiment is used, it is possible to independently correct the six hues of red, green, blue, yellow, magenta, cyan, and the degree in change in the six inter-hue zones, by varying the coefficients for the first arithmetic terms each relating to a specific hue, or for the second arithmetic terms each relating to a specific inter-hue zone. Accordingly, the conversion characteristics can be varied flexibly.

When the first correction amount calculator according to the present embodiment is used, the αβ calculator 18 calculates and outputs the maximum value β and the minimum value α of the first color data Ri, Gi, Bi, so that by using the maximum value β and the minimum value α, it is possible to simplify the configuration of the lightness information calculator 8 and the chroma information calculator 10 in the characteristics information determining unit 12.

The above described Embodiment 2 has been described for the case where processing is implemented by hardware. But similar functions and effects are obtained by means of software.

What is claimed is:

1. A color conversion device performing color conversion on first image data consisting of a plurality of first color data, and constituting image information for each pixel, into second image data consisting of a plurality of second color data, and constituting image information for each pixel, comprising:
    a unit for determining first color correction amounts from said first image data;
    a unit for determining characteristics information of said first image data;
    a unit for determining second color correction amounts from said characteristics information and said first color correction amounts; and
    a unit for determining said second image data by adding or subtracting said second color correction amounts to or from said first image data;
    wherein said characteristics information determining unit calculates said characteristics information by calculation using lightness information and chroma information of said first image data.

2. The color conversion device as set forth in claim 1, wherein said second color correction amount determining unit determines said second color correction amounts by multiplying said first color correction amounts by a multiplication coefficient corresponding to said characteristics information.

3. The color conversion device as set forth in claim 1, wherein said characteristics information determining unit includes a unit for adding said lightness information and said chroma information.

4. The color conversion device as set forth in claim 1, wherein said characteristics information determining unit further comprises a lightness information calculator for calculating the maximum value of said plurality of first color data as said lightness information.

5. The color conversion device as set forth in claim 1, wherein said characteristics information determining unit further comprises a chroma information calculator for calculating said chroma information using the maximum value and the minimum value of said plurality of first color data.

6. The color conversion device as set forth in claim 5, wherein said chroma information calculator calculates said chroma information using the difference between the maximum value and the minimum value of said plurality of first color data.

7. A color conversion method performing color conversion on first image data consisting of a plurality of first color data, and constituting image information for each pixel, into second image data consisting of a plurality of second color data, and constituting image information for each pixel, comprising:
    a step of determining first color correction amounts from said first image data;
    a step of determining characteristics information of said first image data;
    a step of determining second color correction amounts from said characteristics information and said first color correction amounts; and
    a step of determining said second image data by adding or subtracting said second color correction amounts to or from said first image data;
    wherein said characteristics information determining step calculates said characteristics information by calculation using lightness information and chroma information of said first image data.

8. The color conversion method as set forth in claim 7, wherein said second color correction amount determining step determines said second color correction amounts by multiplying said first color correction amounts by a multiplication coefficient corresponding to said characteristics.

9. The color conversion method as set forth in claim 7, wherein said characteristics information determining step includes a step of adding said lightness information and said chroma information.

10. The color conversion method as set forth in claim 7, wherein said characteristics information determining step further comprises a step of calculating the maximum value of said plurality of first color data as said lightness information.

11. The color conversion method as set forth in claim 7, wherein said characteristics information determining step further comprises a step of calculating said chroma information using the maximum value and the minimum value of said plurality of first color data.

12. The color conversion method as set forth in claim 11, wherein said step of calculating said chroma information calculates said chroma information using the difference between the maximum value and the minimum value of said plurality of first color data.

* * * * *